(12) United States Patent
Uhde et al.

(10) Patent No.: US 7,066,155 B2
(45) Date of Patent: Jun. 27, 2006

(54) METHOD AND SYSTEM FOR THE CONTROL OF FUMIGATION

(75) Inventors: Brandon K. Uhde, El Paso, TX (US); Ezell R. Clarke, Las Cruces, NM (US); Stephen C. Masters, El Paso, TX (US); Douglas B. Waits, El Paso, TX (US)

(73) Assignee: Autotronic Controls Corporation, El Paso, TX (US)

( * ) Notice: Subject to any disclaimer, the term of this patent is extended or adjusted under 35 U.S.C. 154(b) by 0 days.

(21) Appl. No.: 10/878,753

(22) Filed: Jun. 28, 2004

(65) Prior Publication Data

US 2005/0284451 A1    Dec. 29, 2005

(51) Int. Cl.
*F02M 21/06* (2006.01)

(52) U.S. Cl. ....................... 123/525; 123/527

(58) Field of Classification Search ................ 123/525, 123/527, 27 GE
See application file for complete search history.

(56) References Cited

U.S. PATENT DOCUMENTS

| 4,335,697 | A | * | 6/1982 | McLean ..................... 123/527 |
| 4,553,504 | A | | 11/1985 | Duggal et al. |
| 4,694,802 | A | | 9/1987 | Lowi |
| 5,224,457 | A | | 7/1993 | Arsenault et al. |
| 6,026,787 | A | * | 2/2000 | Sun et al. .................... 123/525 |
| 6,131,552 | A | * | 10/2000 | Paielli et al. ............... 123/527 |
| 6,230,683 | B1 | | 5/2001 | zur Loye et al. |
| 6,276,334 | B1 | | 8/2001 | Flynn et al. |
| 6,286,482 | B1 | | 9/2001 | Flynn et al. |

OTHER PUBLICATIONS

Bully Dog Technologies, LLC Advertisement Mar. 13, 2002.

* cited by examiner

*Primary Examiner*—Henry C. Yuen
*Assistant Examiner*—Jason Benton
(74) *Attorney, Agent, or Firm*—Fitch, Even, Tabin & Flannery

(57) ABSTRACT

A system and method of adjusting the rate of supplementary fuel flow to an engine while monitoring the operating characteristics of an engine. The amount of pressure to apply to a regulator valve is determined based at least in part upon the operating conditions of the engine and information included in a stored fuel grid.

16 Claims, 26 Drawing Sheets

2880v3 DIESEL ENGINE PROPANE FUMIGATOR 2 BLOCK DIAGRAM

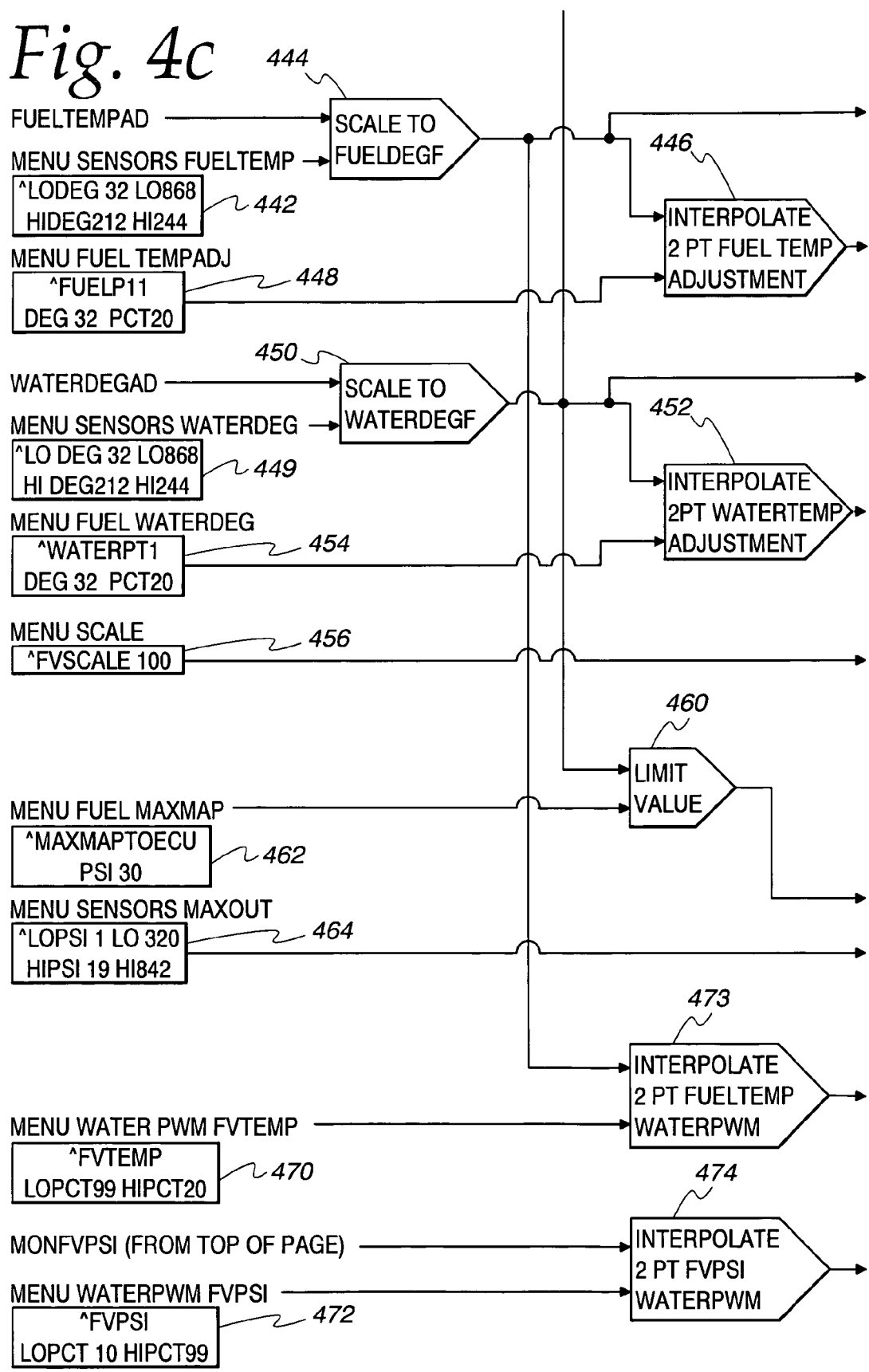

Fig. 5a
2880 M03 DIESEL ENGINE PROPANE FUMIGATOR 2

MONITOR LIST
1 SCANTIME 1SEC
2 PWM 127
3 RPM12500
4 FVPSIA 30.0
5 FVTARGET 30.0
6 FVGRID30.0
7 PEDALIN1023
8 FVPEDAL1023
9 FUELDEGF 255
10 MAPIN 99.9
11 MAPOUT 99.9
12 ACQRUN ARM
13 2 PEDAL 1023
14 FUELSW ON
15 FUELRELAY ON
16 WATERDEGF 255
17 IDLEPSIA 12.5
18 CRUISE_OFF

MENU — 500

MONITOR  STATS
SENSORS  FUEL

^s SCANTIME 1SEC
H RPM      1800          502

^MAPIN   MAPOUT          504
FUELDEG  PEDAL*

0-99        0-996 s4                    0-99        0-996 s4
^LOPSIA 2    LO 52                      ^LOPSIA 13   LO236
HIPSIA 29    HI 648                     HIPSIA 29    HI608
0-99        0-996 s4                    0-99        0-996 s4

0-255       0-996 s4
^L0DEG 32    LO868          ^PEDAL
HIDEG212     HI244          LO788    HI 152
0-255       0-996 s4        0-1020s4  0-1020 s4

^FVPSI   WATERDEG*
PEDAL2   MAPPED

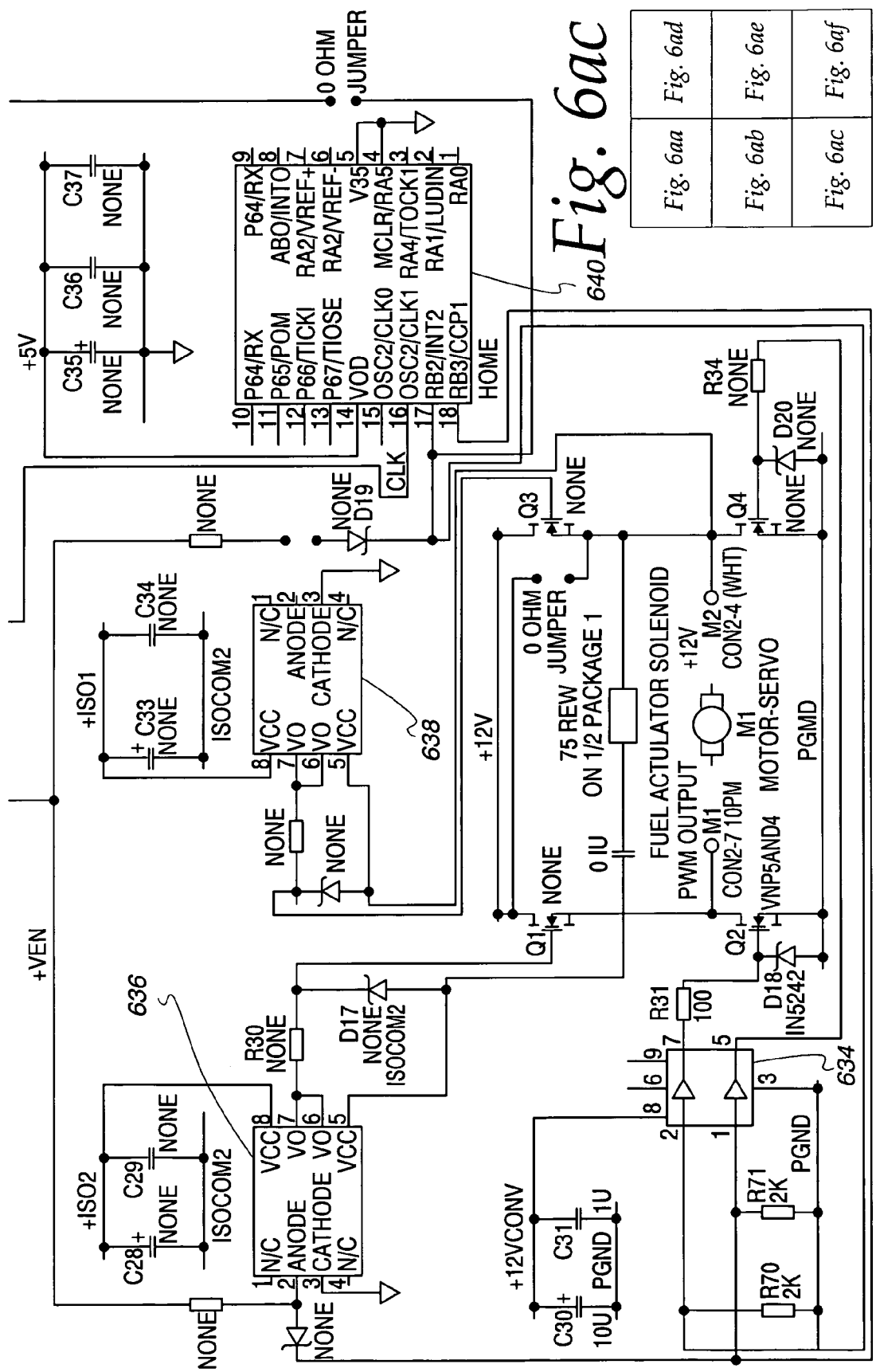

Fig. 6af

| WIRE COLOR | BOARD DESCRIPTION | NEW FUNCTION | CON2 | | NEW FUNCTION | BOARD DESCRIPTION | WIRE COLOR |
|---|---|---|---|---|---|---|---|
| (RED) | FUEL AEL+ | BATT+ | 1 | 23 | TMAP SENSOR GND | TPS1- | (BLK) |
| (ORG) | TAS+ | +12V SPARE | 2 | 24 | SPA. SENSOR GND | TPS2- | |
| | FAULT-JMPR | | 3 | 25 | SENSOR GND | FUELPED1- | |
| (WHT) | M2 | FUEL REG SOL +12V | 4 | 26 | SENSOR GND | FUELPED2- | |
| (BLK) | PGND | PGND | 5 | 27 | SPARE | MAP- | (BLK) |
| | PGND | SPARE | 6 | 28 | ENA PRO FUM INP SW | PGND | |
| (GRN) | N1 | PWM OUT TO FUEL REG SOL | 7 | 29 | | ENAPRFUM | (PINK) |
| | | | 8 | 30 | | | |
| | EXTRAELENABEL | | 9 | 31 | SENSOR GND | HALL- | |
| (YEL) | FUEL VALVEOUT | | 10 | 32 | | MAGPK- | |
| | LPGWATER | | 11 | 33 | FROM COIL- FOR RPM | TACHIN | |
| | THRRETSOL | | 12 | 34 | SPA ANALOG INPUT | TPS2 IN | |
| (RED/GRN) | NAP+ | (+5Y2) | 13 | 35 | WATER TEMP ENG SENS TEMP2 IN | | (OK, BLUE) |
| (RED) | TP51+ | (+5Y2) | 14 | 36 | FVPSI FUEL PRESS | TPS1 IN | (BLUE) |
| | TP52+ | (+5Y2) | 15 | 37 | REMOTE LED PET | FAULT- | |
| | FUELPED1+ | (+5Y2) | 16 | 38 | | FAULT-JMPR | |
| | FUELPED2+ | (+5Y2) | 17 | 39 | REMOTE LED OUT | FAULT+ | (BRN/WHT) |
| | HALL+ | | 18 | 40 | SPA ANALOG INPUT | FUEL TEMP | |
| (ORG) | FUELPED1 | | 19 | 41 | | MAPOUT | |
| (WHT) | TACH/HALL | | 20 | 42 | INPUT | FUEL PED2 | (TAN) |
| | MAGPK+IN | | 21 | 43 | FUEL TEMP (TMAP) | TEMP1 | (YEL) |
| (BRN) | MAPIN | | 22 | 44 | | | |

WIRE JUMPER (BRN/ORG) — 608

HEADER22x2

Fig. 6bb

| WIRE COLOR | BOARD DESCRIPTION | NEW FUNCTION | CON2 | | NEW FUNCTION | BOARD DESCRIPTION | WIRE COLOR |
|---|---|---|---|---|---|---|---|
| (RED) | FUEL REL+ | BATT+ | 1 | 23 | TMAP SENSOR GND | TPS1- | (BLK) |
| (ORG) | TAS+ | +12V SPARE | 2 | 24 | SPA SENSOR GND | TPS2- | |
| | FAULT-JMPR | | 3 | 25 | SENSOR GND | FUELPED1- | |
| (WHT) | M2 | FUEL REG SOL +12V | 4 | 26 | SENSOR GND | FUELPED2- | |
| (BLK) | PGMD | PGMD | 5 | 27 | SENSOR GND | MAP- | (BLK) |
| | PGMD | SPARE | 6 | 28 | SPARE | PGND | |
| (GRN) | N1 | PWM OUT TO FUEL REG SOL | 7 | 29 | ENA PRO FUM INP SW | ENAPRFUM | (PINK) |
| | | | 8 | 30 | | | |
| | EXTRELENABEL | | 9 | 31 | SENSOR GND | HALL- | |
| (YEL) | FUEL VALVEOUT | | 10 | 32 | SENSOR GND | MAGPK- | |
| | LPGWATER | | 11 | 33 | FROM COIL- FOR RPM | TACHIN | |
| | THRRETSOL | | 12 | 34 | SPA ANALOG INPUT | TPS2 IN | |
| (RED/GRN) | NAP+ | (+5Y2) | 13 | 35 | WATER TEMP ENG SENS TEMP2 IN | (OK BLUE) | |
| (RED) | TP51+ | (+5Y2) | 14 | 36 | FVPSI FUEL PRESS | TPS1 IN | (BLUE) |
| | TP52+ | (+5Y2) | 15 | 37 | REMOTE LED PET | FAULT- | |
| | FUELPED1+ | (+5Y2) | 16 | 38 | REMOTE LED OUT | FAULT-JMPR | |
| | FUELPED2+ | (+5Y2) | 17 | 39 | | FAULT+ | (BRN/WHT) |
| | HALL+ | | 18 | 40 | SPA ANALOG INPUT | FUEL TEMP | |
| (ORG) | FUELPED1 | | 19 | 41 | | MAPOUT | |
| (WHT) | TACH/HALL | | 20 | 42 | INPUT | FUEL PED2 | (TAN) |
| | MAGPK+IN | | 21 | 43 | FUEL TEMP (TMAP) | TEMP1 | (YEL) |
| (BRN) | MAPIN | | 22 | 44 | | | |

WIRE JUMPER (BRN/ORG)

HEADER22x2

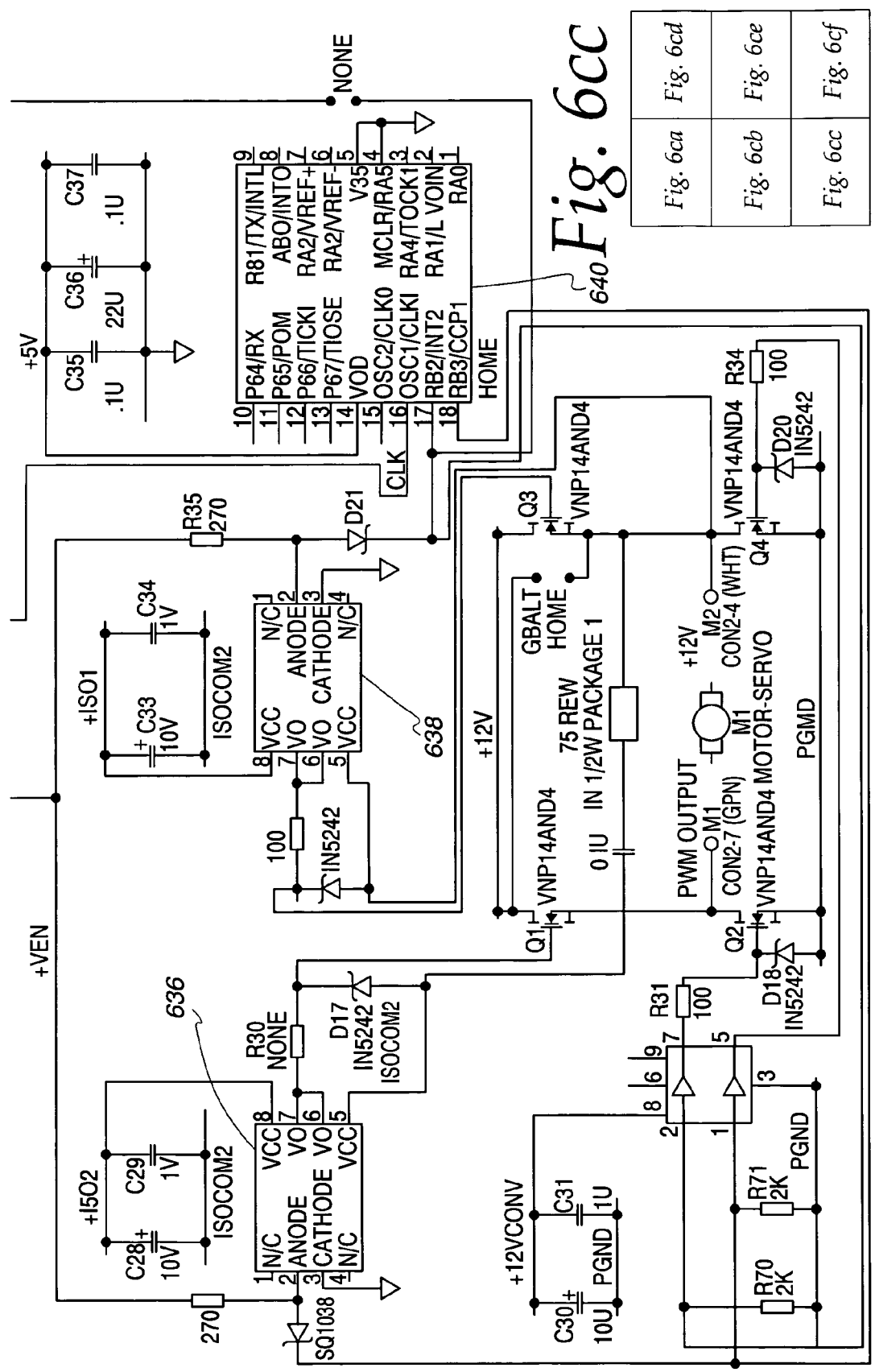

Fig. 6cf

| WIRE COLOR | BOARD DESCRIPTION | NEW FUNCTION | CON2 | NEW FUNCTION | BOARD DESCRIPTION | WIRE COLOR |
|---|---|---|---|---|---|---|
| (RED) | FUEL REL+ | 1GN IN V+ | 1 — 23 | TPS1- | TPS1- | (BLK) |
| (ORG) | TRS+ | TRS+ | 2 — 24 | TPS2- | TPS2- | (NONE) |
| (BAN/ORG) | FAULT-JMPR |  | 3 — 25 | FUELPEDAL1- | FUELPED1- | (BLK) |
| (WHT) | M2 | THROTTLE SERVO | 4 — 26 | FUELPEDAL2- | FUELPED2- | (NONE) |
| (BLK) | PGND | PGND | 5 — 27 | MAP- | MAP- | (NONE) |
| (NONE) | PGND | SPARE | 6 — 28 | SPARE | PGND | (NONE) |
| (GRN) | M1 | THROTTLE SERVO | 7 — 29 | LIFT SW | ENAPRFUM | (PINK) |
|  |  |  | 8 — 30 |  |  |  |
| (NONE) | EXTRELENABEL | SPARE OUTPUT | 9 — 31 | SENSOR GND | HALL- | (BLK) |
| (YEL) | FUEL VALVEOUT | FUEL VALVEOUT | 10 — 32 | MAG- | MAGPK- | (GRN) |
| (NONE) | LPGWATER | SPARE OUTPUT | 11 — 33 | FROM COIL- FOR RPM | TACHIN | (NONE) |
| (VIO) | THRRETSOL | TRS- | 12 — 34 | TPS2 IN | TPS2 IN | (NONE) |
| (NONE) | MAP+ | MAP+ | 13 — 35 | HALL TEMP2 | TEMP2 | (OK, BLUE) |
| (RED) | TPS1+ | TPS1+ | 14 — 36 | TPS1 IN | TPS1 IN | (BLUE) |
| (NONE) | TPS2+ | TPS2+ | 15 — 37 | REMOTE LED RETURN | FAULT- | (NONE) |
| (RED/GRN) | FUELPED1+ | FUELPED1+ | 16 — 38 |  | FAULT-JMPR | (BRN/ORG) |
| (NONE) | FUELPED2+ | FUELPED2+ | 17 — 39 | REMOTE LED OUTPUT | FAULT+ | (BRN/WHT) |
| (ORG) | HALL+ | (+5V2) | 18 — 40 | ENABLE OPERATION | FUEL TEMP | (GREY) |
| (ORG) | FUELPED1IN | PEDAL 1 IN | 19 — 41 | TPS OUT | MAPOUT | (BRN/VIO) |
| (WHT) | TACH/HALL | RPM | 20 — 42 | PEDAL 2 IN | FUEL PED2 | (NONE) |
| (VIO) | MAGPK+IN | AVAILABLE (N/C) | 21 — 43 | HALL TEMP1 | TEMP1 | (YEL) |
| (BRN) | MAPIN | MAP IN | 22 — 44 |  |  |  |

HEADER22x2
WIRE JUMPER (BRN/ORG)

| WIRE COLOR | BOARD DESCRIPTION | NEW FUNCTION | CON2 | NEW FUNCTION | BOARD DESCRIPTION | WIRE COLOR |
|---|---|---|---|---|---|---|
| (RED) | FUELREL+ | 1GN IN V+ | 1 — 23 | TPS1- | TPS1- | (BLK) |
| (ORG) | TRS+ | TRS+ | 2 — 24 | TPS2- | TPS2- | (NONE) |
| (BAN/ORG) | FAULT-JMPR |  | 3 — 25 | FUELPEDAL1- | FUELPED1- | (BLK) |
| (WHT) | M2 | THROTTLE SERVO | 4 — 26 | FUELPEDAL2- | FUELPED2- | (NONE) |
| (BLK) | PGND | PGND | 5 — 27 | MAP- | MAP- | (NONE) |
| (NONE) | PGND | SPARE | 6 — 28 | SPARE | PGND | (NONE) |
| (GRN) | M1 | THROTTLE SERVO | 7 — 29 | LIFT SW | ENAPRFUM | (PINK) |
| (NONE) | EXTRELENABEL | SPARE OUTPUT | 8 — 30 |  |  |  |
| (YEL) | FUEL VALVEOUT | FUEL VALVEOUT | 9 — 31 | SENSOR GND | HALL- | (BLK) |
| (NONE) | LPGWATER | SPARE OUTPUT | 10 — 32 | MAG- | MAGPK- | (GRN) |
| (VIO) | THRRETSOL | TRS- | 11 — 33 | FROM COIL- FOR RPM | TACHIN | (NONE) |
| (NONE) | MAP+ | MAP+ | 12 — 34 | TPS2 IN | TPS2 IN | (NONE) |
| (RED) | TPS1+ | TPS1+ | 13 — 35 | HALL TEMP2 | TEMP2 | (OK, BLUE) |
| (NONE) | TPS2+ | TPS2+ | 14 — 36 | TPS1 IN | TPS1 IN | (BLUE) |
| (RED/GRN) | FUELPED1+ | FUELPED1+ | 15 — 37 | REMOTE LED RETURN | FAULT- | (NONE) |
| (NONE) | FUELPED2+ | FUELPED2+ | 16 — 38 |  | FAULT-JMPR | (BRN/ORG) |
| (ORG) | HALL+ | (+5V2) | 17 — 39 | REMOTE LED OUTPUT | FAULT+ | (BRN/WHT) |
| (ORG) | FUELPED1IN | PEDAL 1 IN | 18 — 40 | ENABLE OPERATION | FUELTEMP | (GREY) |
| (WHT) | TACH/HALL | RPM | 19 — 41 | TPS OUT | MAPOUT | (BRN/VIO) |
| (VIO) | MAGPK+IN | AVAILABLE (N/C) | 20 — 42 | PEDAL 2 IN | FUELPED2 | (NONE) |
|  |  |  | 21 — 43 |  |  |  |
| (BRN) | MAP IN | MAP IN | 22 — 44 | HALL TEMP1 | TEMP1 | (YEL) |

HEADER22x2
WIRE JUMPER (BRN/ORG)

METHOD AND SYSTEM FOR THE CONTROL OF FUMIGATION

FIELD OF THE INVENTION

The field of the invention relates to engine fuel delivery systems for motor vehicles and more particularly to LPG fumigation systems for diesel engines in motor vehicles.

BACKGROUND OF THE INVENTION

Fumigation techniques are known to improve the power output and boost of an engine. In some situations, fumigation also increases the life of the engine, reduces fuel consumption, and decreases the noise produced by the engine.

In diesel engine fumigation systems, supplemental fuel that has been vaporized is placed into the intake stream of the engine. Specifically, a fuel vaporizer converts liquid fuel into a gas and another device, for instance, a venturi mixer, pulls the vaporized fuel into the main air intake of the engine for use by the engine. The fumigation process provides only a portion of the fuel used by the engine. The remainder of the fuel used by the engine may also be applied to the cylinders of the engine in the conventional manner.

Fumigation systems use various types of fuel as the supplementary fuel that is to be added to the engine. For instance, the supplementary fuel may be of the same type as the primary fuel. However, in many instances, the supplementary fuel is of a different form, for instance, in the form of liquid propane gas (LPG).

Previous fumigation systems add the supplementary fuel to the engine in either a proportional amount to engine boost or at a single preset fuel level. Consequently, previous systems are unable to take into account changes in engine in operating conditions. No feedback from the engine is provided so that the current conditions of the engine can not be used to alter the amount of supplementary fuel added or the timing of when this fuel is added. Because of these drawbacks, previous systems suffer from situations where the engine becomes over-boosted and over-revved. The over-boosting and over-revving of the engine results in wasted fuel and the decreased performance and life of the engine.

Additionally, in previous systems, regulators were activated by the reduced pressure signal (with respect to ambient pressure) that is developed in the signal generator device installed into the engine intake air stream. Fuel flow is completely reactionary, based on the difference of the signal generator pressure to the ambient pressure.

Moreover, in some previous systems, the flow of a liquid or gas through a restriction is based on the difference of pressure from one side of the restriction to the other. As the pressure difference increases, so does the volume of flow. Unfortunately, the difference may be from increased upstream pressure, or decreased downstream pressure, which is subject to vehicle conditions and out control of the fumigation system. As the flow increases, the flow crosses into the "critical" or supersonic zone. When this situation occurs, the volume of the flow (in cubic feet per minute) does not increase with additional pressure difference across the restriction, so a change in downstream pressure will not affect flow.

SUMMARY OF THE INVENTION

A system and method for adjusting the rate of supplementary fuel flow to an engine adds a controlled amount of supplementary fuel into the intake stream of an engine so that additional torque can be generated. The system and method electronic management of the system to add the supplementary fuel to the engine and calculate an appropriate target pressure to be applied to a regulator.

In one approach, the operating characteristics of an engine are monitored. An orifice may be coupled to a regulator valve and supplementary fuel is supplied through the regulator valve to the orifice. The amount of pressure to apply to a regulator valve is determined and is based at least in part upon the operating conditions of the engine and a stored fuel grid. The pressure of fuel flowing through the orifice is varied by analyzing the operating conditions of the engine and applying these conditions to fuel grid. This action determines a target pressure to apply to the regulator.

Thus, the present system and method takes into account the operating conditions of the engine in deciding the amount of supplementary fuel to supply to the engine. The system and method is advantageous because it prevents over-revving and over-boosting of the engine. Fuel is saved and engine performance is enhanced.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

The system and method described herein determines and adds a controlled amount of LP gas into the intake stream of a diesel engine so that additional torque may be generated. This approach uses the feedback of sensed operating conditions to determine the amount of pressure to use to control a vaporizer/regulator, thereby taking into account the operating conditions of the engine.

Figure 1:
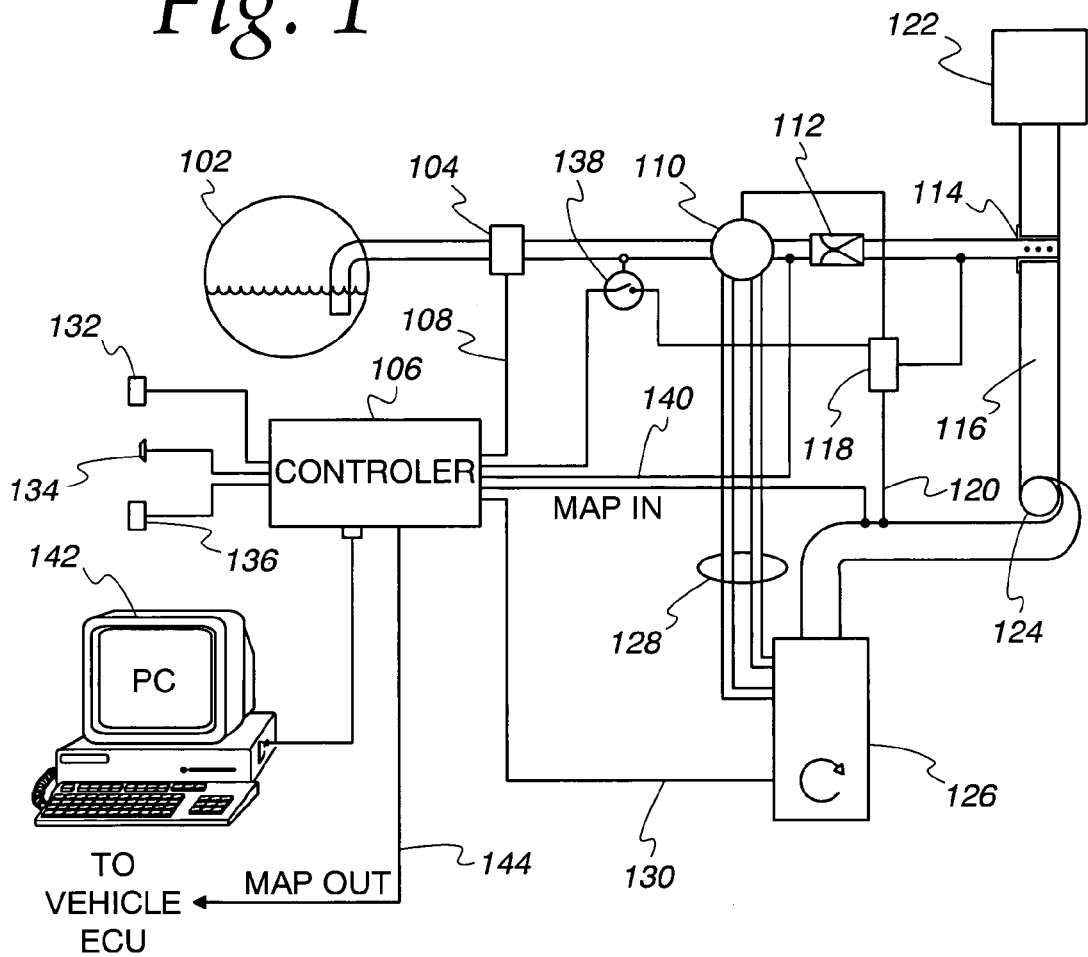
FIG. 1 is a block diagram in accordance with one embodiment of the invention.

Referring now to FIG. 1, an LPG propane tank 102 is coupled to a shut-off valve 104. The shut-off valve 104 halts the flow of propane unless an controller 106 indicates via a control line 108 that the valve 104 should be open.

Fuel flows through the shut-off valve 104 into a vaporizer/regulator 110. The vaporizer/regulator 110 converts the liquid fuel into gas. From the vaporizer/regulator 110, the gaseous fuel vapor flows to a pressure control nozzle 112. The pressure control nozzle 112 causes the fuel flow to generate back-pressure into the vaporizer/regulator 110 to balance the control pressure being applied. A disposal head 114 discharges the fuel vapor into an intake 116.

A three-way PWM valve 118 modulates a pressure supply 120 to control the secondary side of the vaporizer/regulator 110. The pressure supply 120 supplies boost pressure to the inlet of the valve 118. The amount of pressure applied by the valve 118 is determined and controlled by the controller 106 as described elsewhere in this specification.

An air filter 122 cleans the air for use in the intake 116. The intake 116 is coupled to the turbo 124. The turbo 124 creates boost to put additional air into the engine 126. The engine 126 supplies heat via heater lines 128 to boil the liquid propane in the vaporizer/regulator 110. An RPM sensor 130 measures the engine speed for use by the controller 106.

The controller 106 receives an input signal from an arm switch 132. The arm switch 132 allows a driver to activate or deactivate the system. The controller 106 also transmits a signal to activate a check system light 134. The activation of the check system light 104 informs the driver when the system is not operating properly. A throttle pedal 136 is also provided to the controller 106 to allow the driver to request power from the engine 126. The controller 106 is coupled to PC and monitor 142. A MapOut output 144 is coupled to a vehicle ECU (not shown). A MapIn signal 146 is coupled to the engine intake.

The pressure switch 138 is controlled by the pressure seen in the line between 104 and 110. If open, it blocks the electrical signal from the controller 106 to the pressure control valve 118. This switch is used as a safety to verify adequate propane pressure so the regulator can develop the needed balance pressure. If no balance pressure is developed in the regulator in response to the control pressure applied by the valve 118, damage may occur to the regulator assembly.

The liquid pressure switch 138 blocks the control signal of the valve 118 unless adequate pressure is supplied to the vaporizer/regulator 110. The controller 106 obtains temperature and pressure measurements from a sensor 140. The sensor 140 measures the pressure and temperature of the propane between the regulator 110 and nozzle 112.

In the present approach, the system applies pressure from an outside source, such as the manifold pressure 120, or auxiliary air tank pressure, through the electronically controlled three-way solenoid 118 to the back side of the secondary chamber diaphragm on the regulator 110. Fuel flow is induced because the higher primary chamber pressure of the vaporizer/regulator 110 will push fuel to the lower pressure secondary chamber. Since the fuel flow is restricted by the nozzle, secondary chamber pressure increases and balances the secondary diaphragm control pressure, closing the primary chamber discharge port. The pressure in the secondary chamber of the vaporizer/regulator 110 will vent through the nozzle 112, unbalancing the diaphragm, reopening the primary discharge port, increasing the secondary chamber pressure. The system stabilizes at pressures relative to the control pressure, and the flow rates caused by them. The control pressures applied to the secondary diaphragm may be well above ambient pressure (for example, up to 20 psi gauge) to maintain system operation in the critical zone of the nozzle 112.

The design of the regulator 110 allows this type of operation because the primary diaphragm is balanced to the secondary chamber of the regulator. Balancing the primary side pressure allows it to increase with the raised secondary chamber pressure so that fuel flow is maintained from a higher pressure primary chamber to a relatively lower secondary chamber pressure.

Specifically, the control side of the primary diaphragm of the regulator is vented to the secondary chamber. As the pressure in the secondary chamber goes up, this pressure is also seen in the control side of the primary diaphragm. This causes a correspondingly higher pressure to be achieved in the primary chamber. In this way, the normal pressure drop occurs between the primary and secondary chambers, no matter at what pressure the system is operating.

The use of a critical flow nozzle 112 to control the amount of fuel flow in the system is also used in the present approach. The nozzle 112 is a venturi-shaped flow restriction installed at the outlet of the secondary chamber of the vaporizer/regulator 110. In the present approach, the nozzle 112 is sized so the gas flow rate reaches the critical level at a low flow rate. Above the critical flow level, the volume flow rate through the nozzle remains constant, but the mass flow rate (pounds of gas per minute) responds directly to the pressure ahead of the nozzle 112. The mass flow rate of the gas is increased by increasing the pressure upstream of the nozzle, therefore putting denser gas (more pounds of gas per cubic foot of volume) through the nozzle 112. This allows direct control of the amount of gas delivered by the system with minimum effect from outside influences. After the nozzle 112, the gas expands back to atmospheric and is drawn into the engine at the same pressure as the rest of the intake air stream 116.

The shape of the nozzle 112 is based on a cylindrical throat venture nozzle as shown in the ASME handbook. A throat size of 0.130 inch diameter to 0.110 inch diameter is used depending on the vehicle system, and the desired operating pressure. The size of the nozzle 112 (diameter of the throat) is chosen based on the desired operating pressure for the secondary chamber (this is usually based on the pressure available from the intake manifold pressure), and the amount of propane to be passed. The smaller the diameter, the lower the volume flow rate at which critical flow is reached. For the smaller nozzle to have equal mass flow compared to a larger diameter nozzle when both are operating above the critical flow rate, a higher pressure (denser gas) would be required. Since intake manifold pressure values change from vehicle to vehicle, the operating pressure range of the propane system must be tailored to each vehicle type.

As mentioned above, the fuel flow is electronically managed based on vehicle operating conditions of the system. Specifically, when propane operation is requested by the operator, the controller 106 determines if the operating conditions of the engine 126 are within a predetermined window. If all parameters are within the operational window, the system begins adding LP gas. As long as the monitored systems remain within the operational window, the additional fuel flow rate will be based on the fuel map programmed during parameter development. This map consists of a fuel pressure target matrix programmed into the controller (in the fuel grid/target matrix stored therein) and scaling parameters. The controller 106 takes the scaled target pressure and modulates the activity of a three-way solenoid 118 to allow outside pressure into the control port of the regulator 110 causing fuel flow. Fuel outlet pressure is monitored via line 140 and compared to target pressure and the cycle of the three-way solenoid 118 is adjusted to raise or lower control pressure, raising or lowering fuel outlet pressure.

Figure 2:
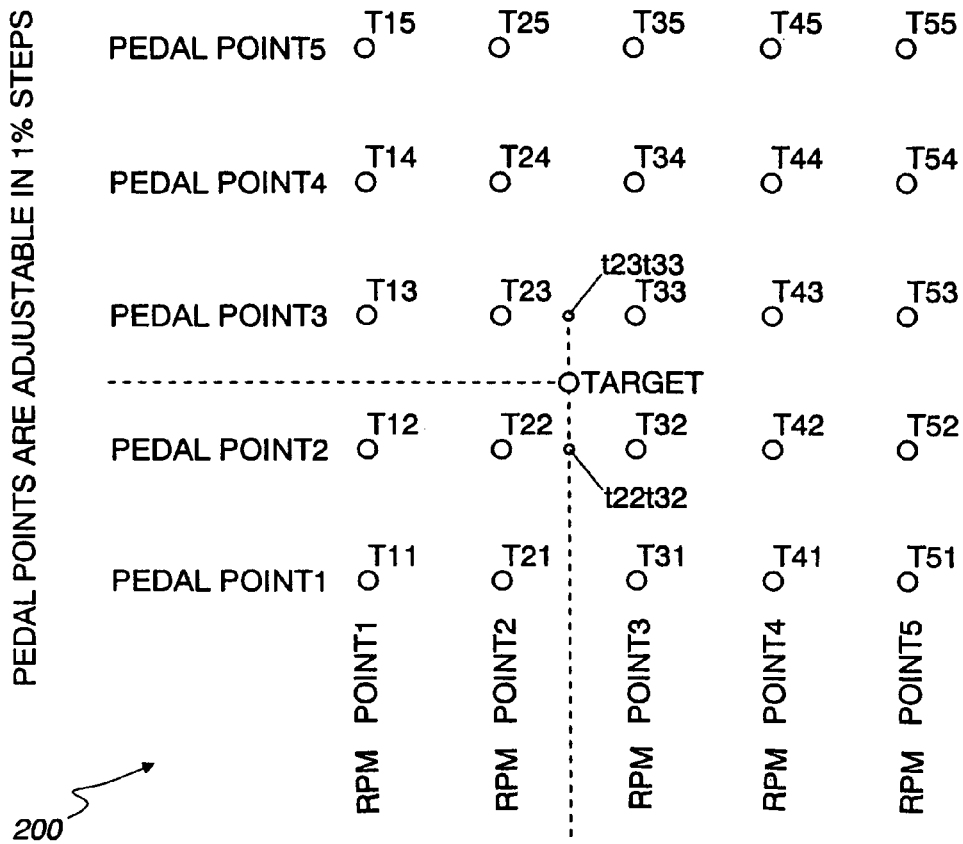
FIG. 2 is a fuel grid in accordance with one embodiment of the invention.
Figure 3:
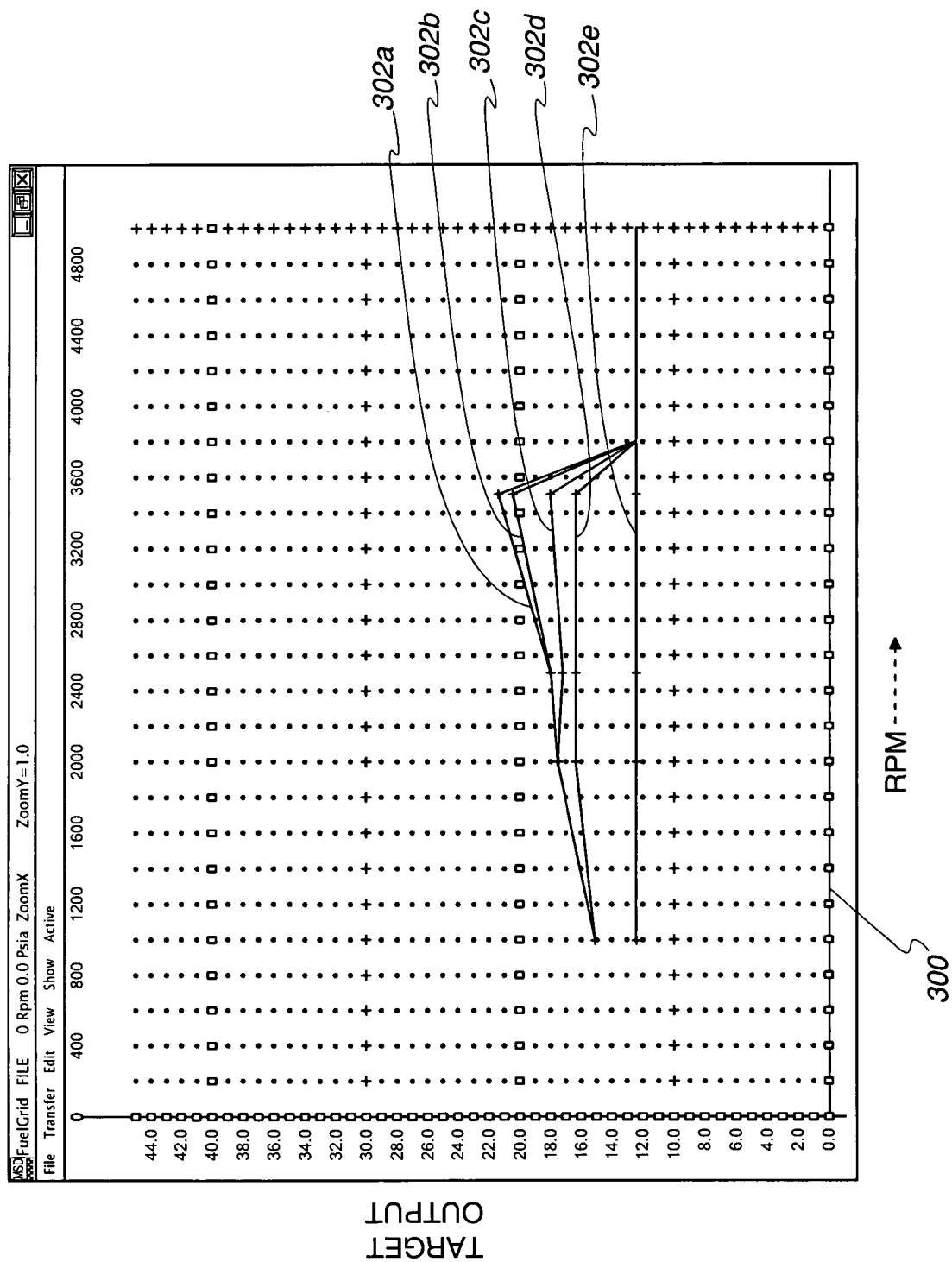
FIG. 3 is a look-up table of a mapping in accordance with one embodiment of the present invention.
Figure 4A:
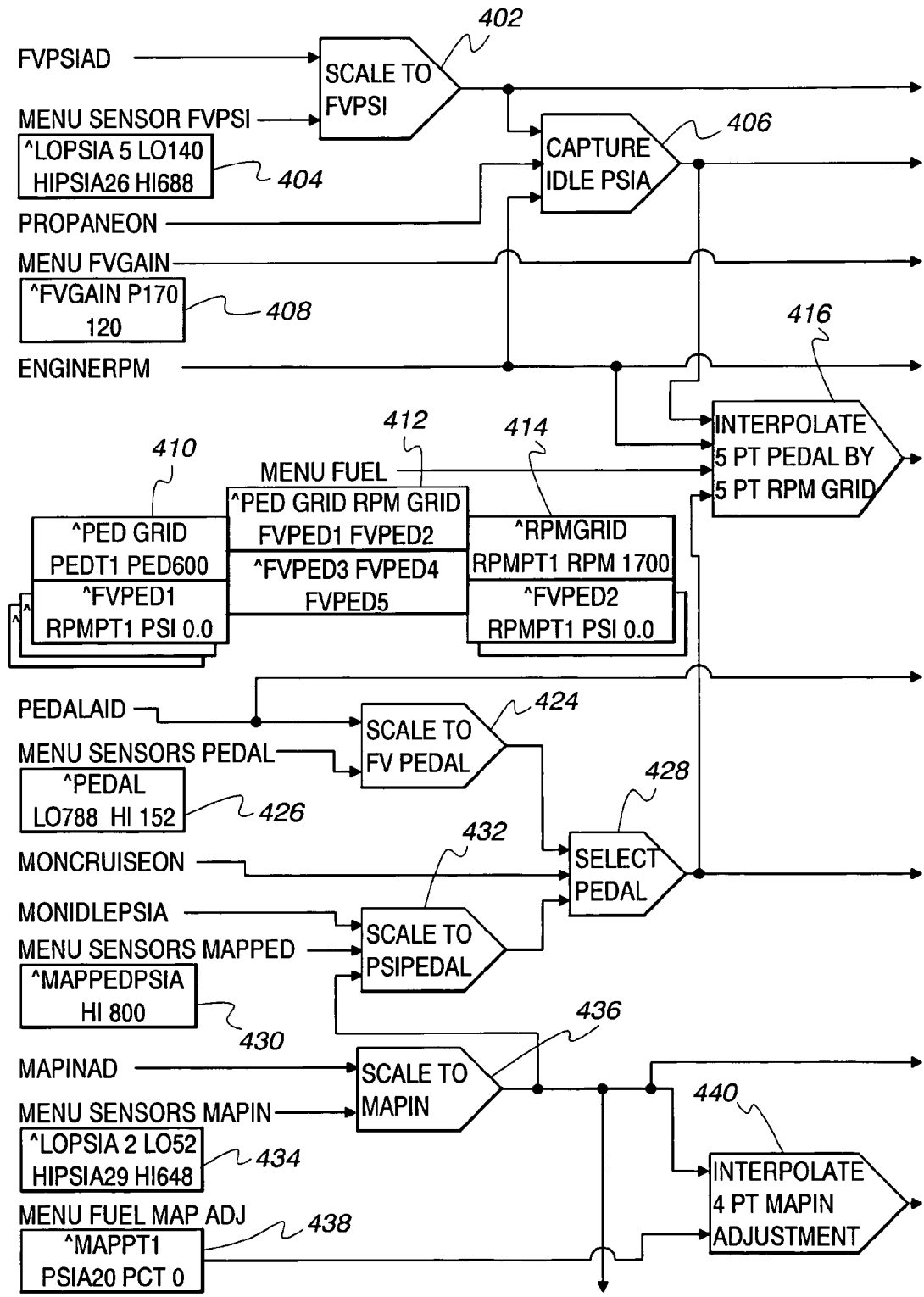
FIG. 4 is a flow chart describing the operation of a fumigation system in accordance with one embodiment of the present invention.
Figure 4B:
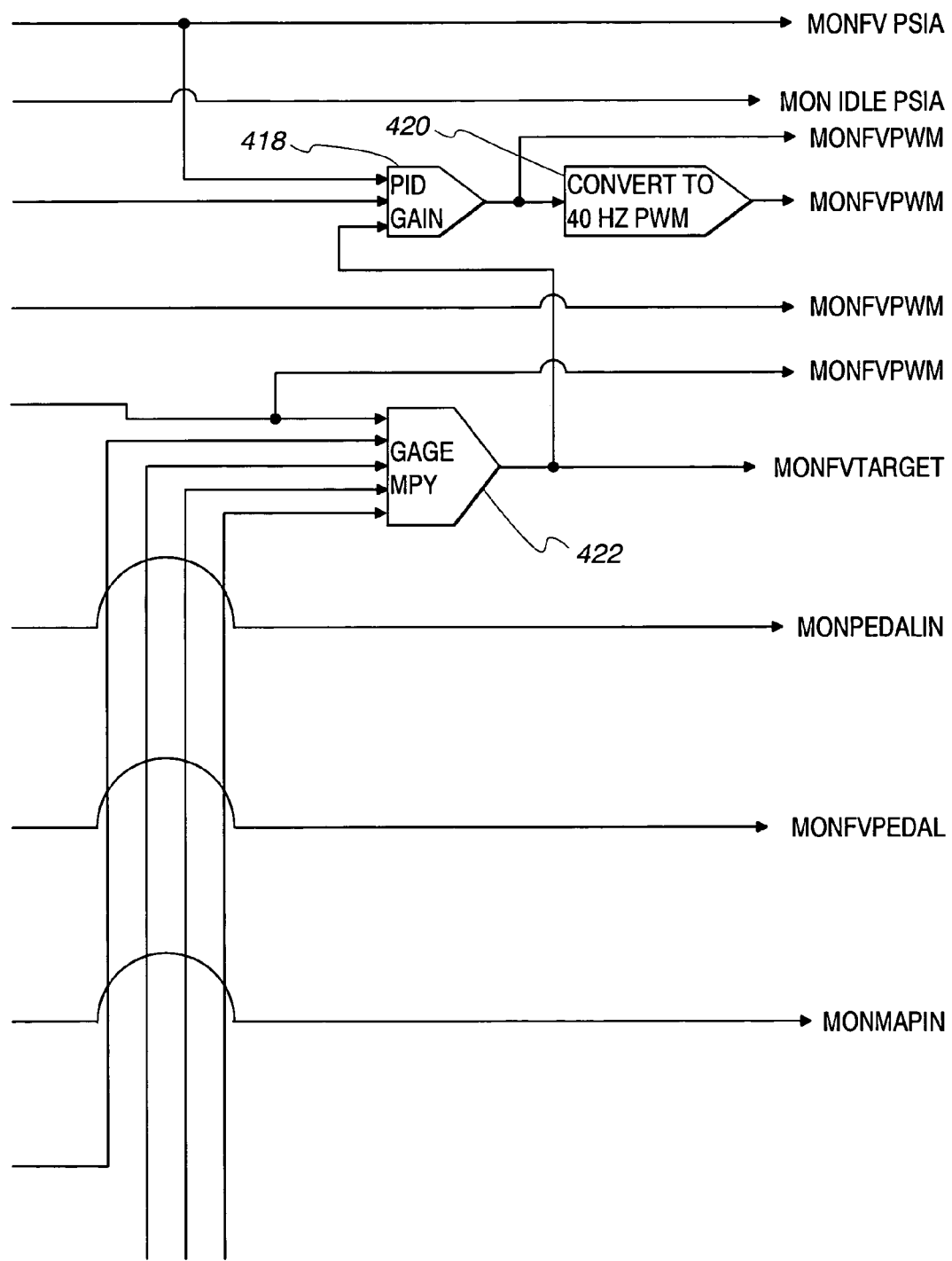
Figure 4D:
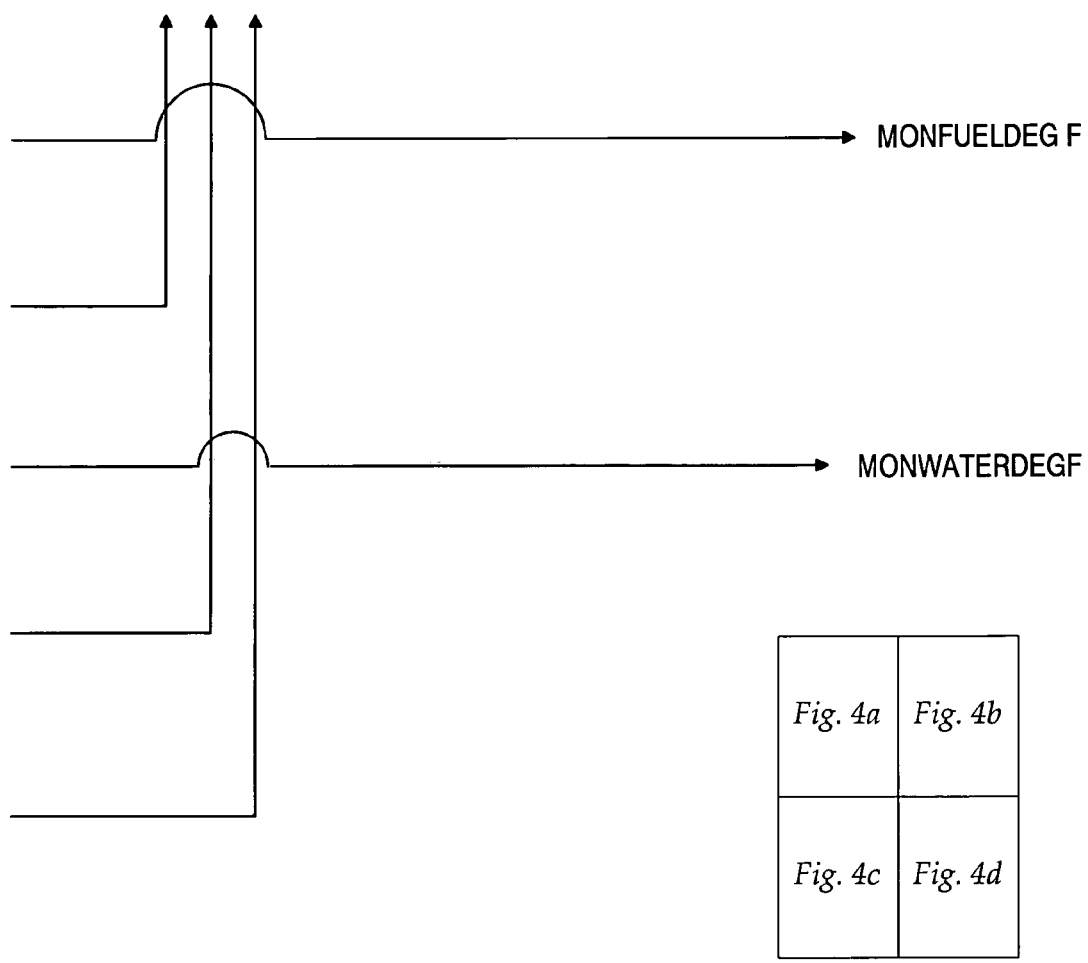
Figure 4D:
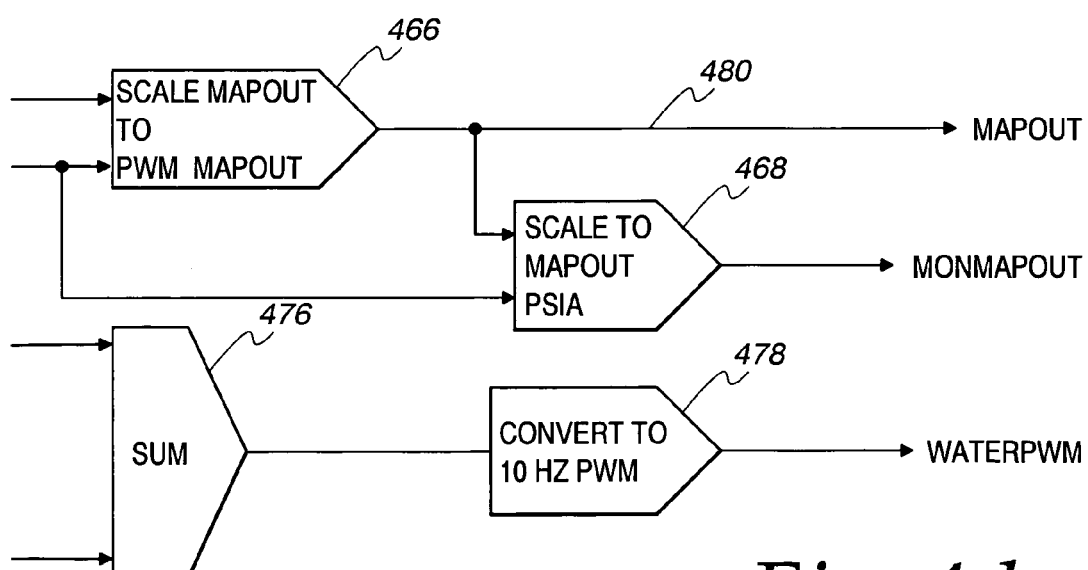

Referring now to FIG. 2, one example of the target matrix (fuel grid) stored by the controller 106 is described. The matrix 200 consists of a 5×5 matrix of points, each corresponding to a throttle pedal position and an engine RPM giving a target fuel pressure. Within the limits of this matrix are the only conditions in which fuel will flow. The scaling parameters and other safety limits may disallow fuel flow even when the target matrix may indicate opportunity. The fuel grid pressure target is interpolated within each cell for RPM and throttle position inputs as conditions change. A look-up table, for example, the one shown in FIG. 3, is then used to find the target fuel pressure.

In this example, each point on the matrix represents an RPM and pedal position. For instance, T23 represents the output pressure for an RPM of RPMPoint2 and pedal position of PedalPoint3. The inputs to the fuel grid are RPM and throttle position and the fuel target pressure is interpolated in steps. First, RPM is interpolated in two steps. Next, the pedal points are interpolated to find the target pedal position. Once these steps have been performed, a look-up table is used to find the correct target pressure value.

In one example of the above-described procedure, to find the output target pressure, point t23t33 is interpolated between points T23 and T33 using RPM. Then point t22t32 is interpolated between points T22 and T32 again using RPM. Then, the Target point is interpolated between t23t33 and t22t32 using pedal position. The Target value itself is found using a look-up table, for example, the look-up table of FIG. 3.

The values of FIG. 2 may be entered by a user using a menu. For example, this may be performed as described below with respect to steps 410 and 414 of FIG. 4. In this case, the user may input the values shown on the grid.

The grid value for the lowest throttle setting line is variable and is adjusted during vehicle operation by the controller 106. This value is set at the engine air intake pressure reading from the fuel pressure sensor when the system is not in operation and engine conditions are within preset limits. This allows the fuel grid to be adjusted to ambient conditions at a range of barometric pressures/altitudes and fuel grid target to always be above ambient pressure.

The fuel grid/matrix is one approach used for system protection, as points may be chosen such that no fuel is allowed to flow during unsafe or improper vehicle conditions. For example, the fuel flow may increase as engine speed increases, but then be reduced/shut off as engine speed continues to increase to help limit engine over speeding.

Sensors are employed by the system to determine the operating conditions of the vehicle and the fumigation system. The monitored vehicle functions include engine RPM, throttle pedal position, intake manifold pressure (boost), ambient pressure, engine water temperature and system request (on/off). The monitored system functions include fuel pressure (at the orifice) and fuel temperature (at the output of the regulator).

All sensors signals are returned to the controller as voltage values. These voltages are converted to a digital value and have a calibration value applied to them that is based on a two-point calibration curve. A known "high" condition and a known "low" condition are applied to the sensor, and the corresponding digital values stored in memory against this calibration. Subsequent voltages applied at this location are interpolated based on these points.

The scaling parameters are applied to the fuel grid pressures and are used to develop the target pressure at the vaporizer/regulator. The scaling parameters include manifold pressure, fuel temperature, engine water temperature and operator scaled input. The manifold pressure scalar is a four point curve with manifold pressure on the x-axis, and percent on the vertical y-axis.

In one example, 20 psia=0%, 22 psia=100%, 30 psia=100%, and 32 psia=0%. Fuel target is scaled to zero when manifold pressure is at 20 psia or below. As manifold pressure increases to 22 psia, fuel target correction is interpolated between 0 and 100%. Correction remains at 100% until the manifold pressure goes above 30 psia at which time the correction factor is interpolated down to zero as pressure continues to gain to 32 psia, at which time target value would be zero or no fuel.

Fuel temperature is corrected directly as a density change with temperature to a lower limit temperature where fuel is shut off to avoid passing unvaporized liquid propane through the regulator. Engine water temperature may be used as an upper limit value to reduce propane pressure when engine water temp climbs above a predetermined value, to reduce chance of engine overheating due to excessive power production. The operator scale is an input value the operator can access to reduce the overall LP gas input to the engine by a direct percentage.

The system also includes a cruise control mode of operation. In this mode, the system recognizes that engine speed is above a preset value (usually 1500 RPM) has changed less than 10% in the last 5 seconds, and the throttle pedal positions is near idle. Under these conditions, the system converts manifold pressure to a simulated throttle pedal position. Since the system would then see engine RPM, and the throttle pedal position to be within the window of operation for propane, it will enable propane based on the simulated throttle pedal position and RPM from the fuel grid and apply the regular scaling factors. As manifold pressure increases and decreases with load simulated throttle pedal position will increase and decrease, changing fueling as set in the fuel grid. If the system sees engine speed change more than 10% or an actual throttle pedal position appear, it reverts to normal operation. The system continuously monitors for stable conditions and will return to cruise when they are met. The cruise mode allows the propane system to engage on vehicles that use remote throttles such as pumpers and generators.

The scaling factors are used to allow tuning flexibility for the system to be applied to many different vehicles/systems. For example, manifold pressure and temperature may be used.

Safety protection for the engine system is also provided to minimize opportunity for operating in damaging conditions. The protection for the system includes engine over speed protection due to reduction of propane as engine speed exceeds boundary settings. Manifold over boost protection due to reduction of propane as manifold pressure exceeds boundary settings is also provided. Temperature protection of cooling system due to a reduction of fuel flow as engine heat output exceeds cooling system capability is additionally provided.

The system corrects target pressure to maintain a constant mass flow rate as density changes with temperature. There is also a low temperature limit that shuts off fuel when fuel temperature drops to a point below which complete vaporization may not occur. If fuel begins to flow through the pressure control system as a liquid or gas/liquid mix, the system will not be able to manage the mass flow of the fuel because the density changes during gas/liquid transition and in liquid phase no longer follow the gas law equations.

Referring now to FIG. 3, an example of a look-up table 300 as used by controller 106 is described. The look-up table 300 includes five plots 302a–e, which represent a fixed pedal reference position. The pedal references 302a–e may be set via an operator as a percentage of pedal position. Each of the references 302a–e is graphed versus engine RPM (horizontal axis) and gives a target fuel pressure. Within the limits of this table are the conditions defining the fuel target pressure to the engine.

Once obtained from the table, the pressure is scaled. The controller 106 takes the scaled target pressure and modulates a three-way solenoid to allow boosted pressure (e.g., line 120 of FIG. 1) into the control port of the regulator, causing fuel to flow. Fuel outlet pressure (from the regulator) is monitored and compared to the target pressure and the duty cycle of the three-way solenoid is adjusted to raise or lower the target pressure, which as a consequence raises or lowers the outlet pressure of the regulator.

In this example of the use of the look-up table, the target pressure varies between 0 to 45 psia. Engine RPM varies between 0 and 5000 RPM. The pedal may be in one of five positions (302a–e). If grid pressure calls for 20 psia at 3200 and 22 psia at 3400 RPM, then it can be interpolated that at 3300 RPM, the target pressure is 21 psia.

Referring now to FIG. 4, an example of an approach for obtaining a target fuel pressure is described. The approach may be implemented via computer software that is stored in the controller 106 of the system. At step 402, the controller scales the ambient pressure (FVPsi), which is received as a voltage value. The scaling or calibration factors (menu sensors FVPsi) are received at step 404. Where known high and low factors are received, for instance, from input of an operator, who programs these factors into the system. Returning to step 402, the known high and low conditions are applied to the sensor value (in this case ambient pressure) to obtain a digital value. This digital value is stored in memory. Subsequent voltage values representing ambient pressure are interpolated based upon the calibration points.

The menu items received at steps 404, 408, 410, 412, 414, 426, 430, 438, 442, 448, 449, 451, 456, 462, 464, 470 and 472 in FIG. 4 are user input values. For each of these items, a field may be displayed as a menu box on the screen of a personal computer for a value to be input by the user. The values received may be digital values input from an analog-to-digital converter for the voltage sent into the controller 106 by the sensor or control signal. The menu box contains the values of the two-point calibration curve for that sensor. These inputs are used to convert the sensor signals from machine units (e.g., millivolts) to correctly scaled human units (e.g., psi, degrees Fahrenheit).

At step 406, an idle psi value is captured. At this step, the system remembers the value read from the regulator pressure sensor when certain programmed conditions are met. It receives an input value (Propane On) indicating the system is activated an engine RPM value Engine RPM). If the propane is off for a predetermined time (e.g., five seconds) and the RPM is below a minimal value (e.g., 1700 RPM), then the atmospheric pressure value is saved.

At step 408, calibration factors (Menu FVGain) are received representing the gain of the fuel valve. This controls the closed loop servo response of the pressure control solenoid. At steps 410, 412 and 414 calibration values relating to the fuel grid (Menu Fuel), RPM grid (Menu RPM Grid), and pedal grid (Menu Ped Grid) are received. These parameters represent the value of the points that have been entered via the menu of the program to determine how much fuel pressure to deliver, at what RPM, and at what pedal position. In other words, the values received in the above-mentioned steps represent the main fuel grid. For example, referring again to FIG. 2, the grid points are defined by the user.

At step 426, calibration values (Menu Sensors Pedal) relating to the pedal position (Menu Sensors Pedal) are received. These user input values used by the system to set the two point digital calibration of the voltage sent to the controller 106 accelerator pedal position sensor. At step 430, calibration values representing a scaling factor for use in cruise control mode (Menu Sensors Map Ped) are received. The accelerator pedal position is represented by manifold pressure. The low value is not shown since the registered atmospheric value is used, and the user inputs the manifold pressure to be taken as full throttle. This type of response allows the propane system to increase or decrease the amount of propane as engine load changes, even though the actual throttle pedal is not changing, since the vehicle is in cruise control.

At step 434, calibration values relating to manifold pressure (Menu Sensors Map In) are received. At step 438, calibration values representing fuel mapping adjustment (Menu Fuel Map Adj) are received. These values are used to scale back the amount of propane as a function of manifold pressure until the manifold pressure reaches the maximum MAP value point. At step 442, calibration values relating to sensed fuel temperature (Menu Sensors Fuel Temp) are received. These values are used to set the two-point digital calibration of the voltage sent to the controller 106 by the temperature sensor that is part of the fuel valve psi sensor. At step 448, calibration values relating to fuel temperature adjustment (Menu Fuel Temp Adj) are received. These values represent the correction factor to be applied to the target fuel pressure to adjust for density changes due to temperature. This scale is based on the natural expansion of the gas as it gets hotter starting from zero pressure at the temperature of absolute zero.

At steps 449 and 442, calibration values relating to the water temperature sensor and fuel temperature (Menu Sensors Water Deg and Menu Fuel Deg) are received. These user input values are used to set the two-point digital calibration of the voltage sent to the ECU by the engine water temperature sensor and fuel temperature sensors. At step 454, a scalar relating to the amount of fuel versus temperature is received. At step 456, calibration values relating to scale (Menu Scale) are received. These values are straight multipliers of the target pressure value that allows reduction of the amount of added propane. In one example, a value of 75 drops the delivered target value to 75 percent of the actual target pressure. At step 462, calibration values relating to fuel max map (Menu Fuel Max Map) are received. The controller 106 has the ability to simulate the manifold absolute pressure signal that is sent to the standard vehicle ECU. The simulated value will represent exactly the actual manifold pressure up to the user input value. As manifold pressure increases beyond this number, the controller 106 sends a signal to the vehicle ECU of this user value.

At step 464, calibration values relating to manifold pressure (Menu Sensors Map Out) are received. These values are received from a user to set the two-point calibration of the simulated vehicle ECU map signal transmitted from the controller 106. At steps 470 and 472, calibration values relating to the temperature of the regulator (Menu Water Pwm Fv Temp and Menu Water Pwm Fv Psi) are received. These values are the user input values used to set the two-point calibration of the water temperature control that may be used to control the temperature of the body of the fuel pressure regulator.

The calibration values discussed above are used to scale the values of various received inputs. For example, at step 424 the pedal position is scaled. At step 402, the idle psi input is scaled. At step 436, the manifold pressure is scaled. At step 444, the fuel temperature is scaled. At step 450, the water temperature of engine is scaled. At step 432, the monitored cruise control is scaled.

At step 460, the manifold pressure value is limited. The simulated value determined represents exactly the actual manifold pressure up to the user input value. As manifold pressure increases beyond this number, the controller 106 sends a signal to the vehicle ECU of this user value.

At step 440, a manifold pressure adjustment is calculated. The value of the adjustment is calculated with respect to a control value, as the control value changes, based upon the relationship of the target point to the control value at two known locations.

At steps 446 and 452, a fuel temperature adjustment and a water temperature adjustment are calculated. These adjustments are used to correct the target pressure at step 422.

At step 416, scaling parameters are applied to the fuel grid pressures as the target pressure at the orifice is determined. The value of the target point is calculated with respect to a control value, as the control value changes, based upon the relationship of the target point to the control value at two known locations. This determines the target pressure as the RPM and the throttle pedal movement between the exact set point on the fuel grid. Further, at step 422, the scaling parameters relating to the manifold pressure, the fuel temperature, the engine water temperature and the operator input indicating whether the system is activated or deactivated are multiplied to obtain a composite/corrected target value. The value obtained using the fuel grid is used along with the other parameters to determine the target pressure to be applied to the vaporizer/regulator.

At step 418, proportional and integrated gains are calculated. The system takes the value obtained by a user entering a FVGain value at step 408 and develops the Fuel Valve Pulse Width Modulation (FVPwm) value, which indicates the on time of the pulse width modulation of the pressure control valve of between 0 and 100 percent in response to the need for pressure change in the system. At step 420, the developed FVPwm value is received and converted to a 12 volt signal at a fixed frequency with an on/off duty cycle matching the FVPwm value.

At step 466 and 468, the manifold pressure are scaled to provide a manifold pressure output. At step 473 and 474, the fuel temperature and fuel pressure control are interpolated. These values are summed at step 476 and converted into a 10 HZ waveform at step 478.

In addition, various values may be monitored and displayed on a monitor screen. For example, the system may be coupled to a handheld monitor or laptop computer. FVPsi, Idle Psi, FV Pwm, RPM, FV Grid, FV Target, Pedal, FV Pedal, Map In, Fuel Deg, Water Deg, and Map Out are monitored. One example of a communication interface is described in U.S. Pat. No. 6,304,814, which is incorporated herein by reference in its entirety.

An output Map Out 480 is an output value that is generated and can be sent to a vehicle ECU in place of the actual Map (Manifold Absolute Pressure) value generated by the original vehicle sensor. This may be used to manipulate the vehicle ECU by limiting how high a manifold pressure signal it receives. This would allow the engine system to operate in a manifold pressure region where the vehicle ECU may normally take steps to avoid (because the vehicle ECU doesn't know the engine system has gone there). The MAP out value from the propane system ECU accurately tracks manifold pressure until a value set in the software (Max Map to ECU) is reached, and then that value is held to that ceiling until manifold pressure drops below, then the propane system returns to sending equivalent map output to map input values.

The variable Water PWM value is a Pulse Width Modulated voltage signal that may be used to control a solenoid that can be installed in the heater lines to the vaporizer/regulator assembly. Controlling the flow of the very hot water through the regulator assembly may keep the regulator from reaching high temperatures, at which deposits may be formed in the regulator from elements dropping out of the propane as it passes through the hot environment.

Figure 5B:
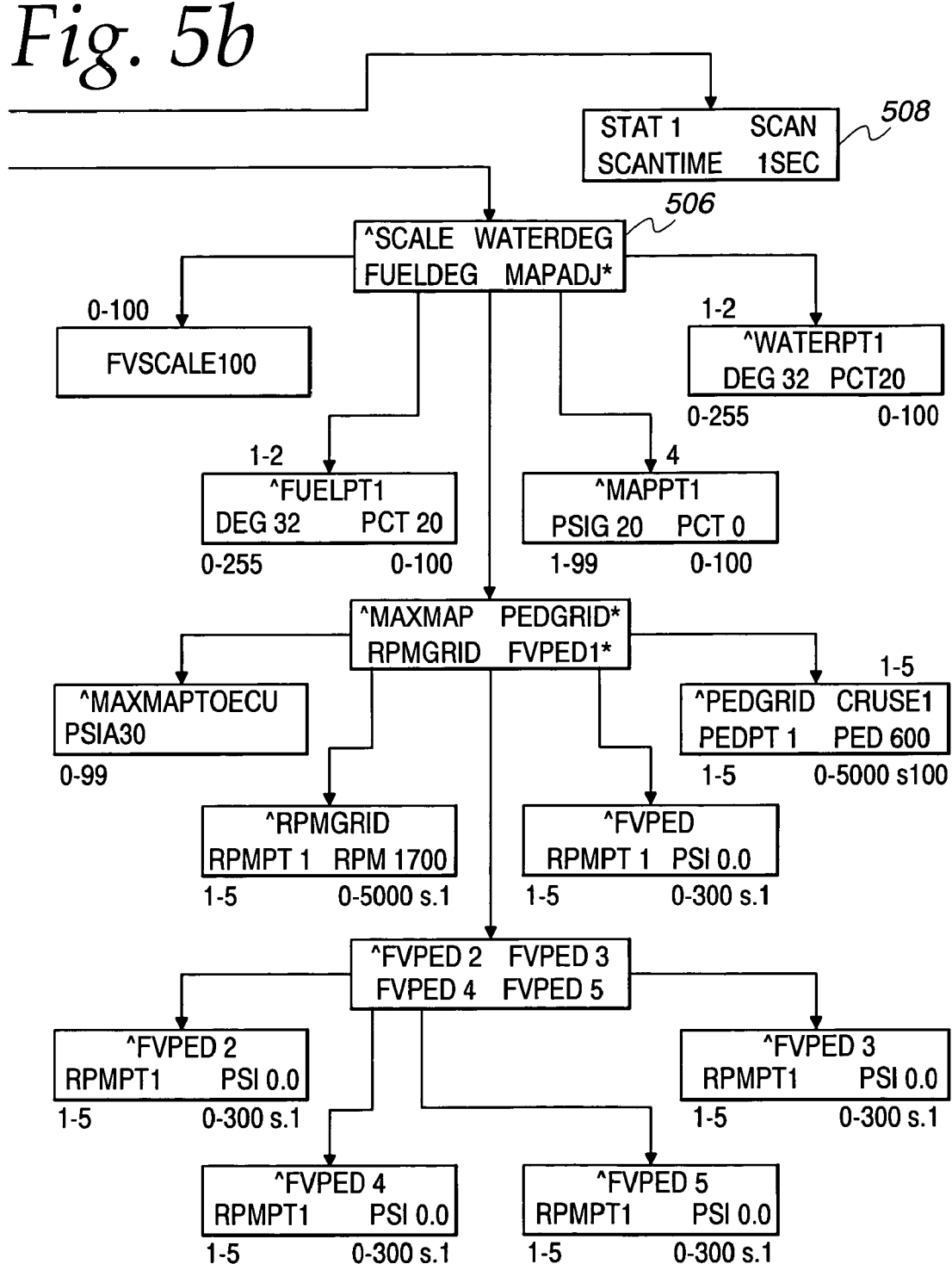
FIG. 5 is a chart showing the menu structure for entering calibration information in accordance with one embodiment of the invention.
Figure 5C:
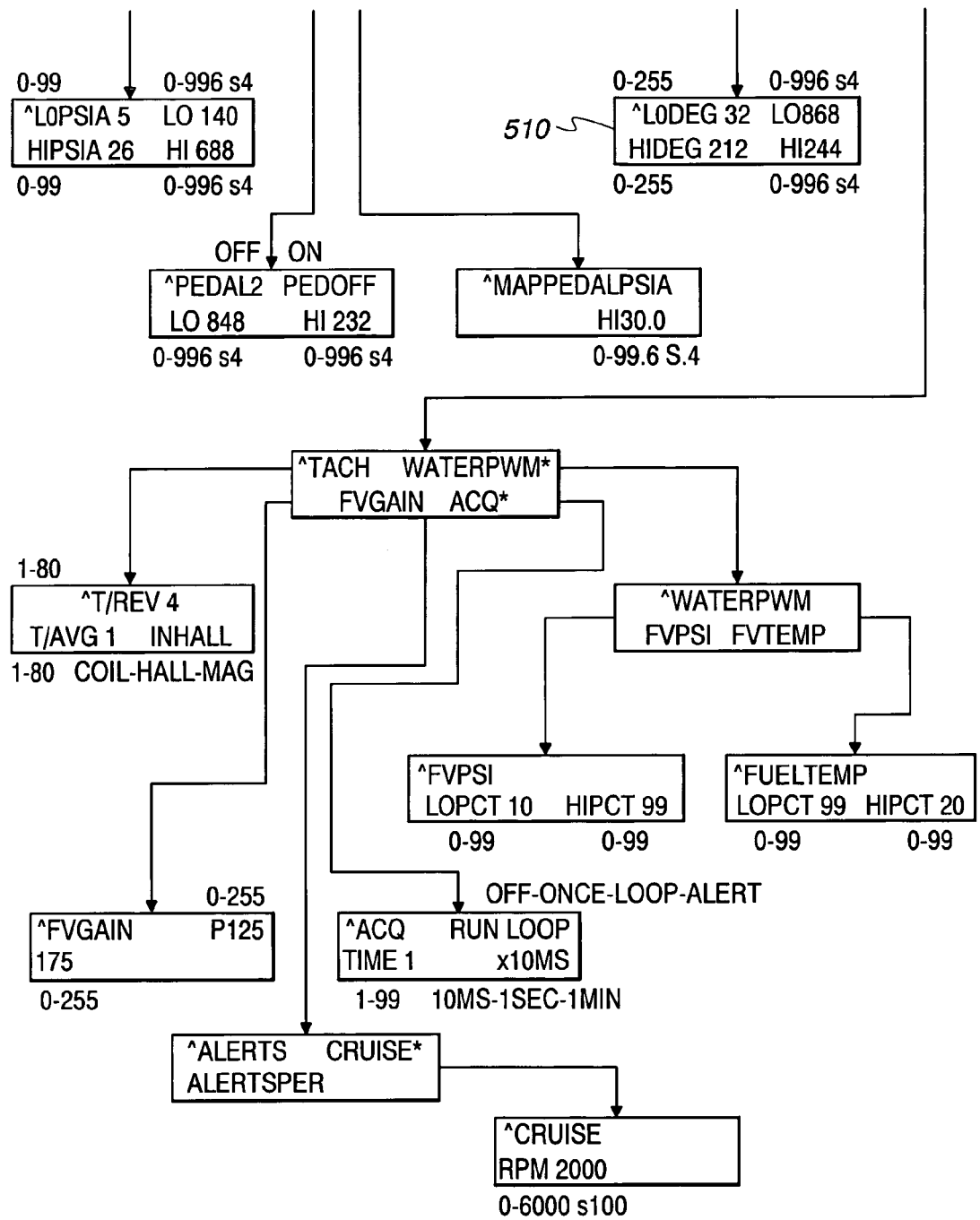

Referring now to FIG. 5, an example of a menu tree used to program the calibration parameters used by the system is described. The menu tree represents various displays that can be made available to an operator on a personal computer display. One example of a user interface is described in U.S. Pat. No. 6,304,814, which has been incorporated herein by reference in its entirety. By using these screens, the user can make selections and move to other screens. In other screens, the user chooses calibration ranges for use by the controller 106 as described above.

One example of the use of the menu tree is now described. The menu tree is entered at step 500. At that step, the user can make a selection of a parameter type, including monitor, stats, sensors, and fuel. After making the selection, the menu progresses at steps 502, 504, 506, and 508, where further choices are made. For example, at step 504, the user can select manifold pressure in (MapIn), FuelDeg, manifold pressure out (MapOut) and Pedal. Each box represents up to four values. The maximum corresponding digital range is shown. For example, box 510 has a low degree value of 32 degrees with a corresponding digital range of 0 to 255.

As can be seen selection is continued until a leaf on the tree is reached. At that point, the user programs in the calibration factors. For instance, if programming reaches step 510, the user programs in the high and low temperature readings (32 and 212) and the corresponding scaled values (868 and 211). Similar choices can be made at all the other leaves of the tree and will not be described here. It will also be apparent to those skilled in the art that the particular menu structure employed and the exact corresponding calibration values may be varied by an operator.

Figure 6A:
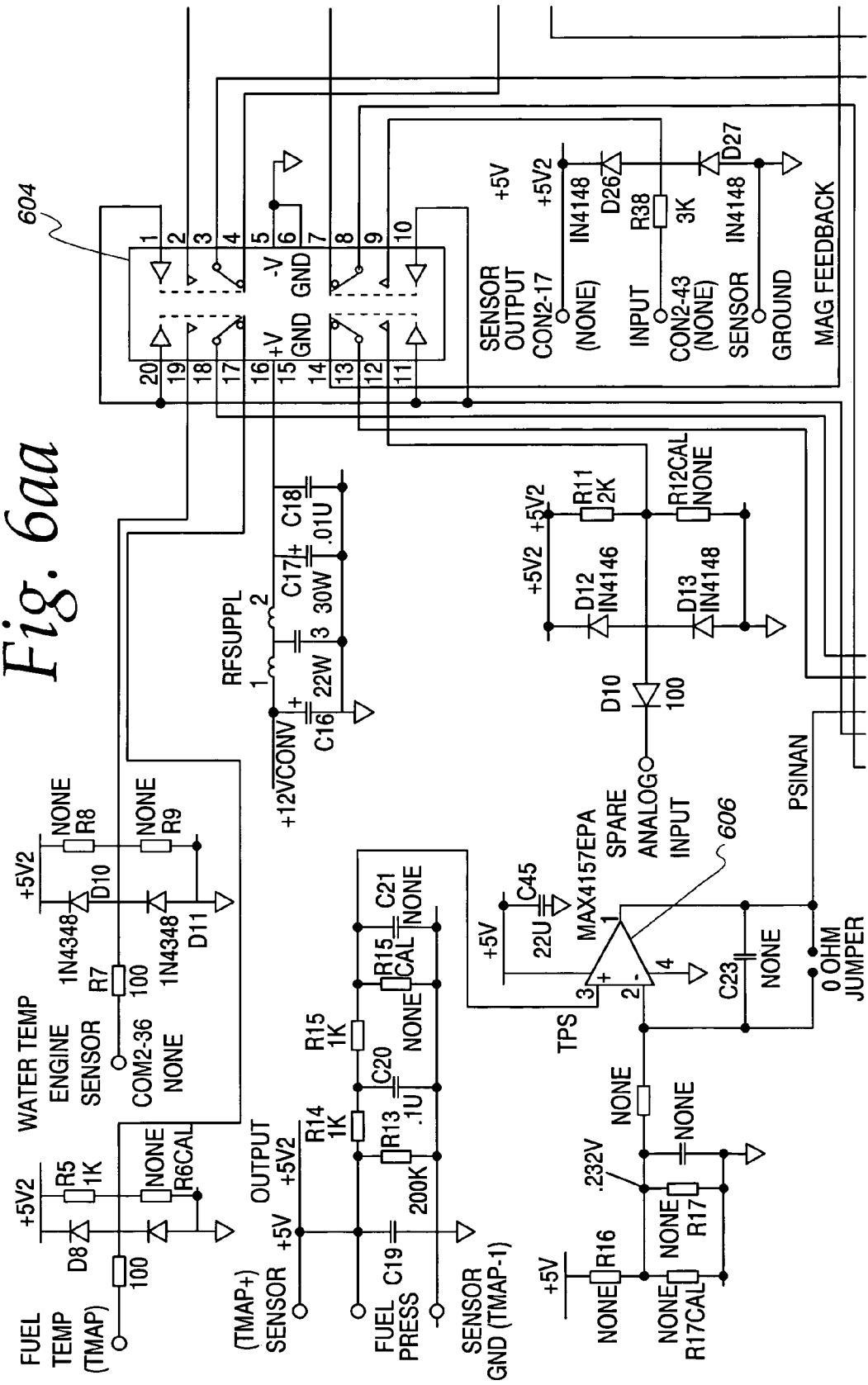
FIGS. 6a–d are schematic diagrams showing one example of portions of a fumigation system in accordance with one embodiment of invention.
Figure 6A:
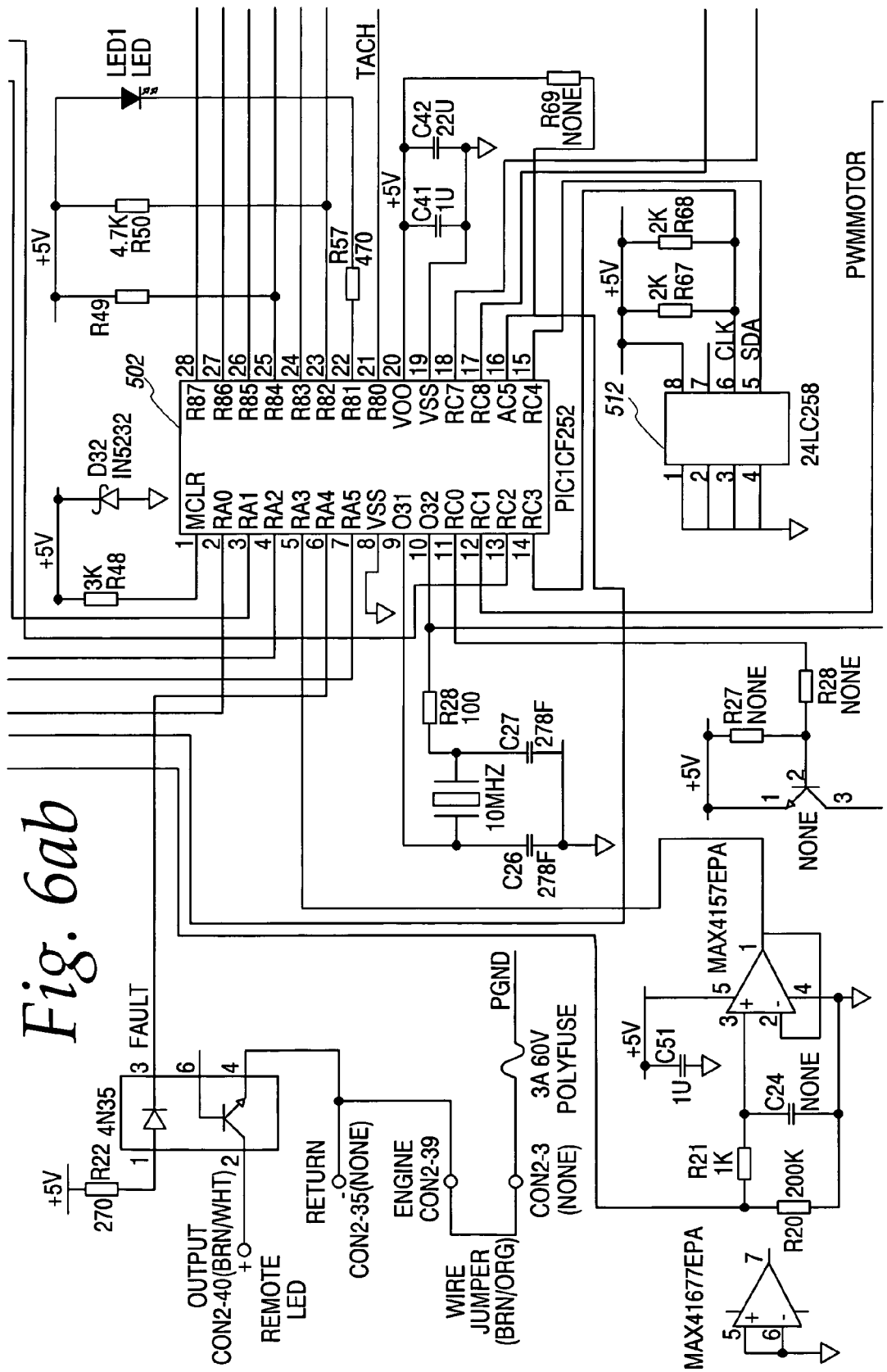
Figure 6A:
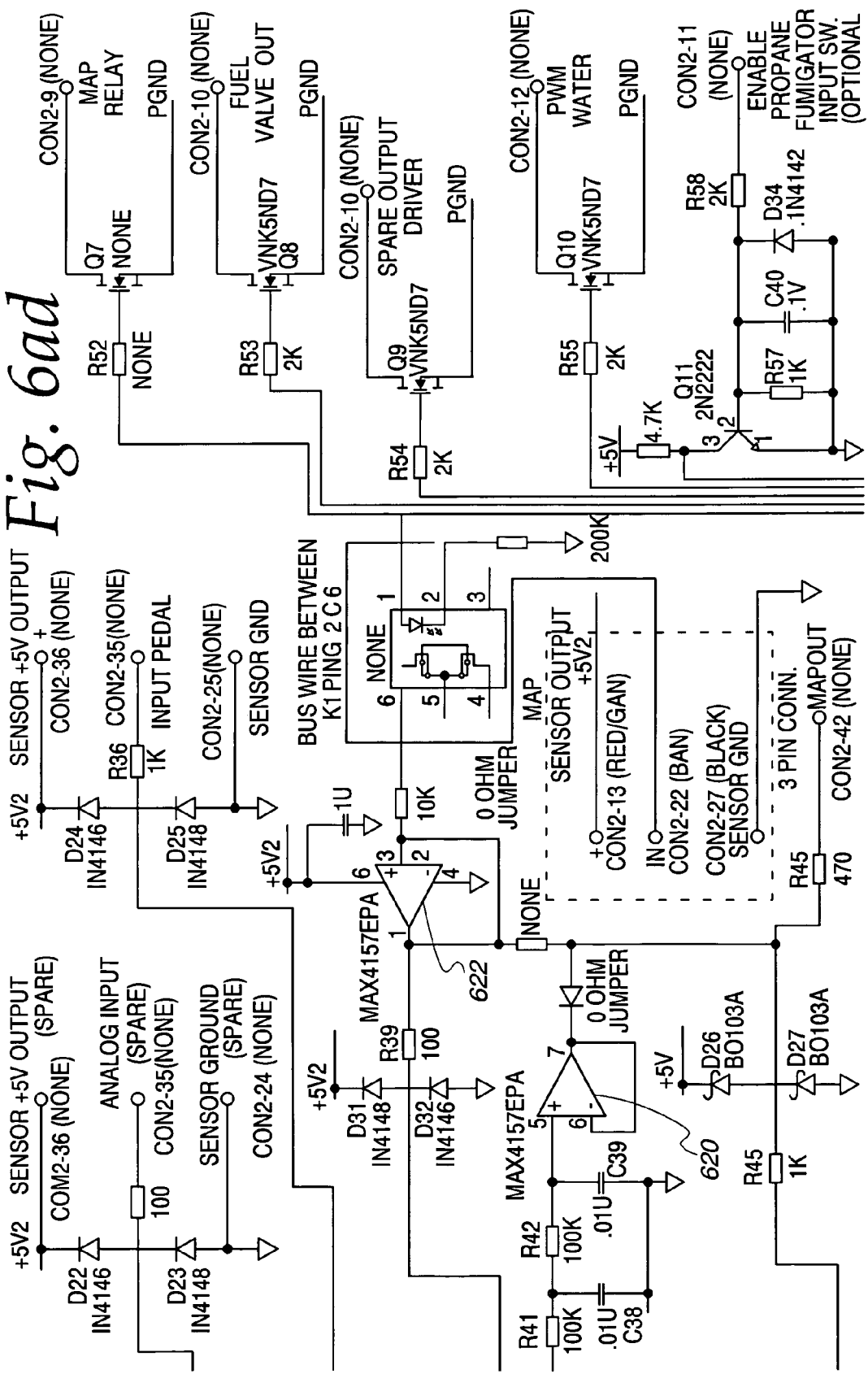
Figure 6A:
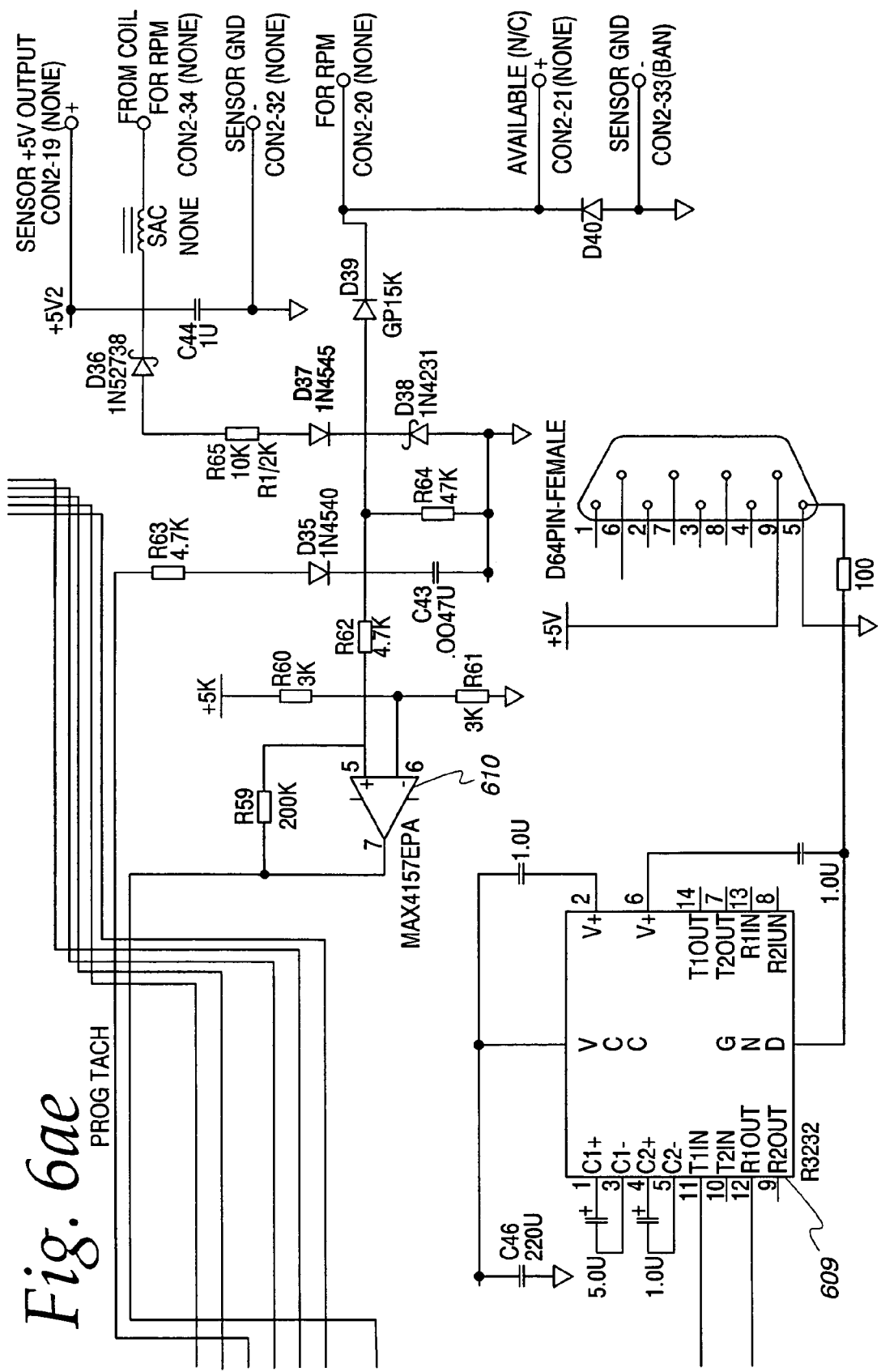
Figure 6B:
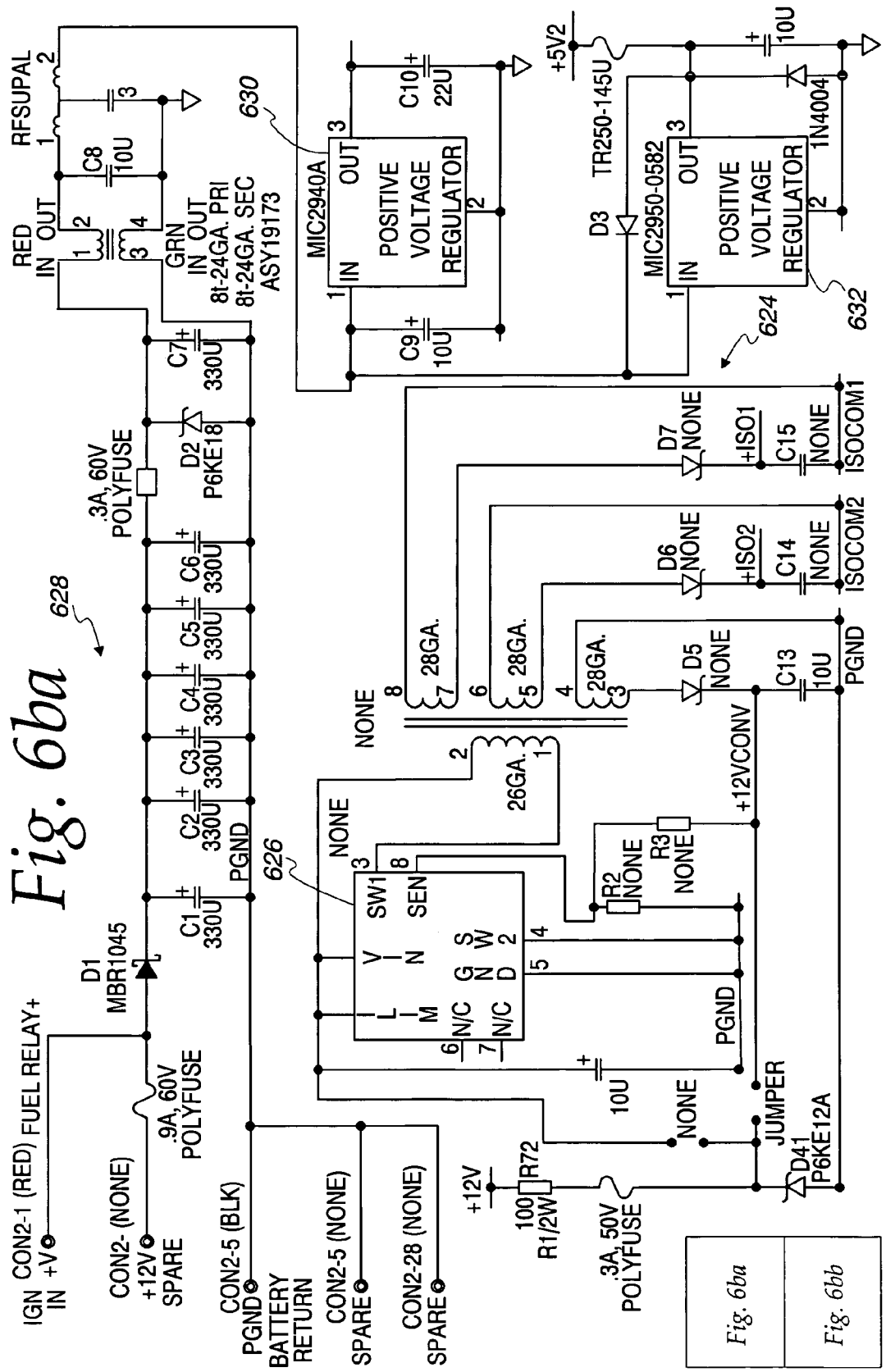
Figure 6C:
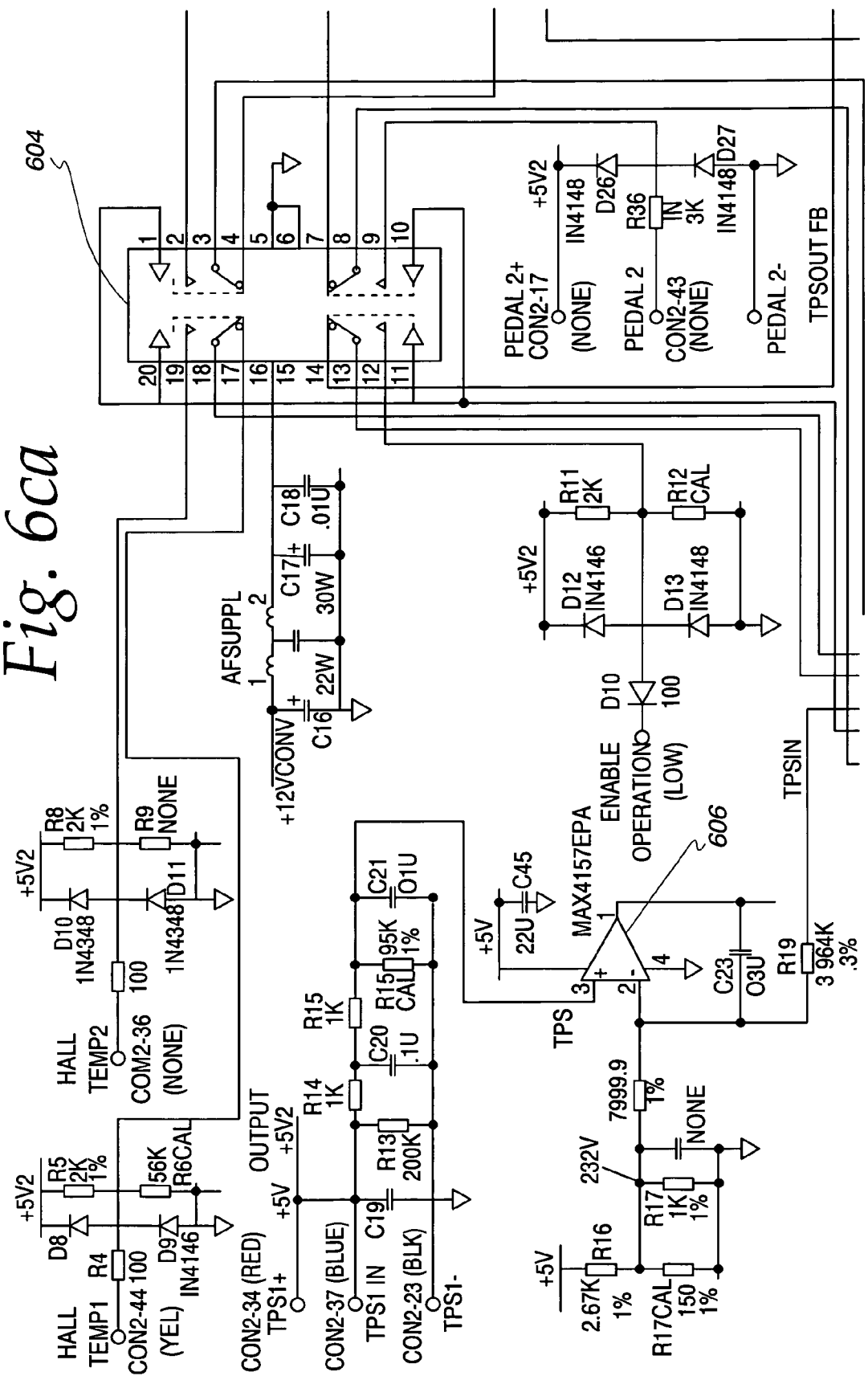
Figure 6C:
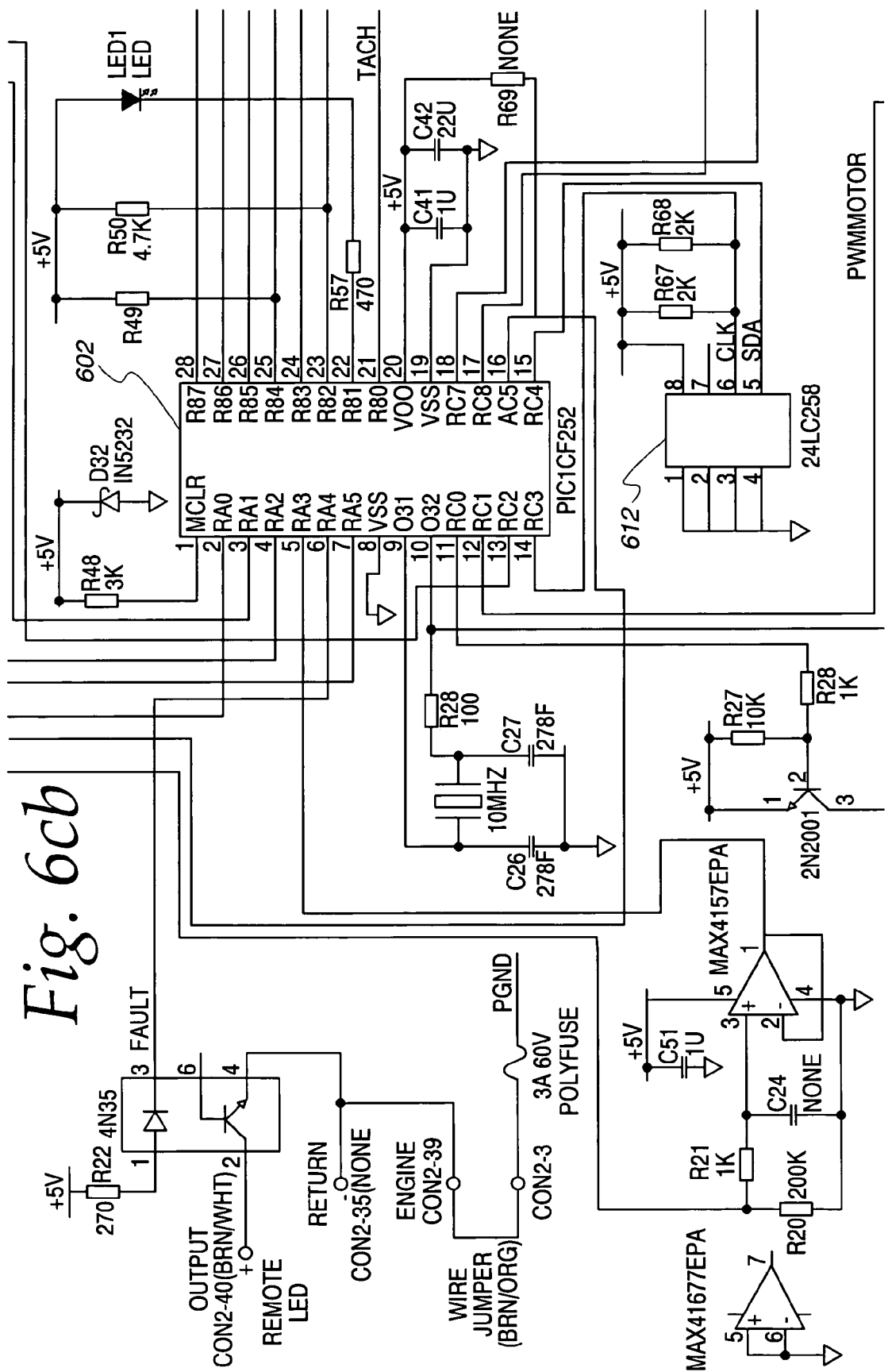
Figure 6C:
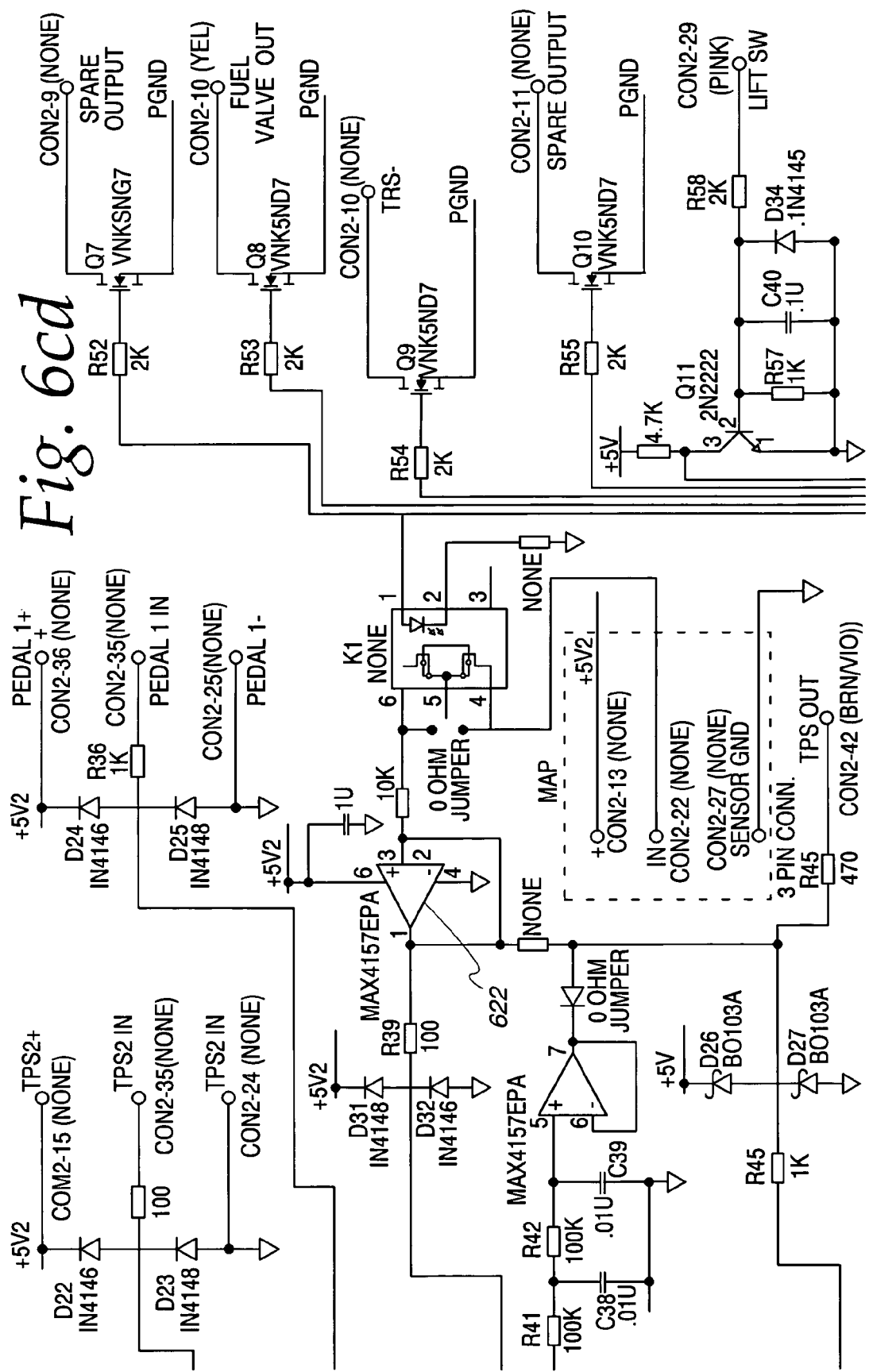
Figure 6C:
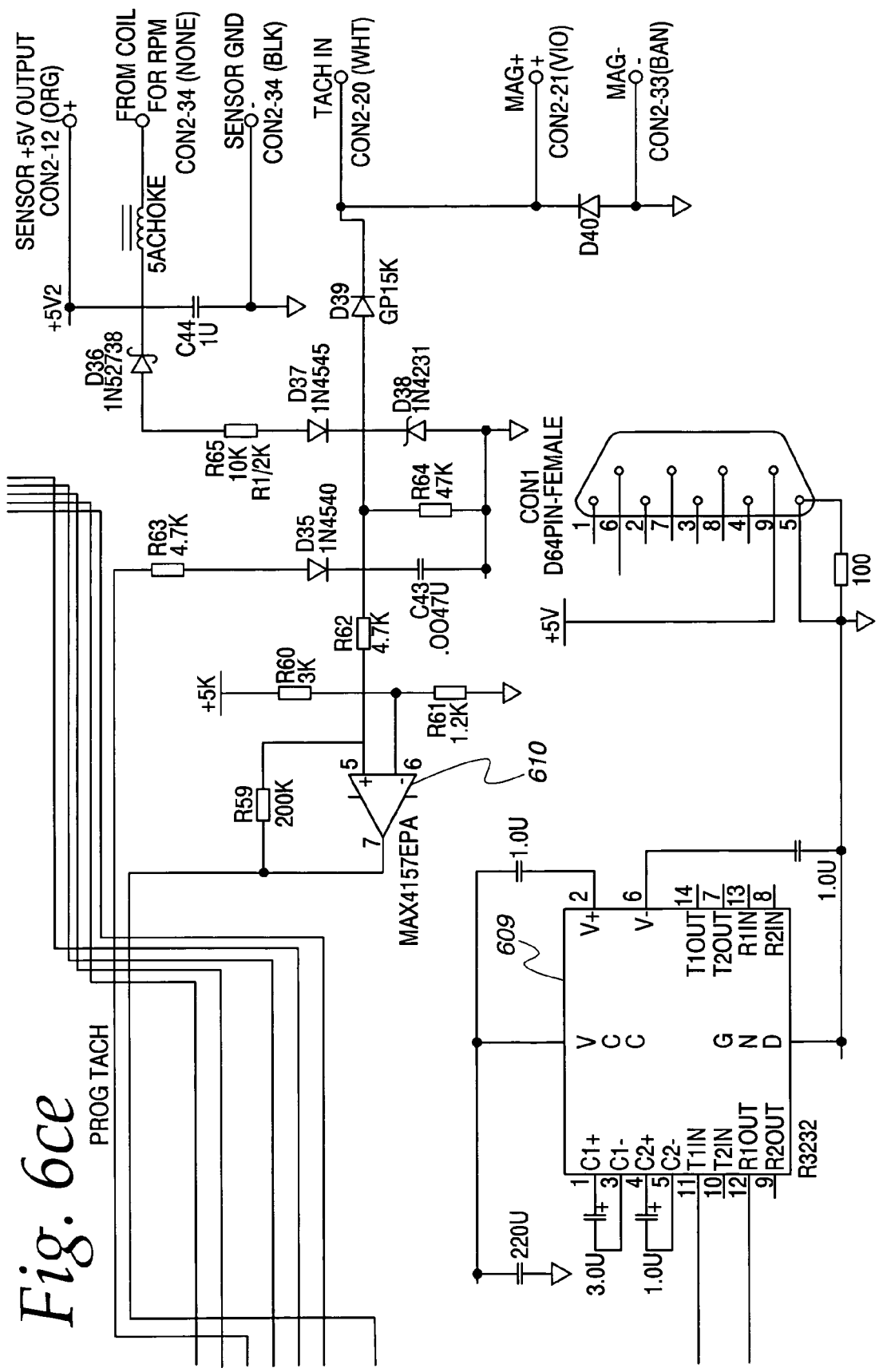
Figure 6D:
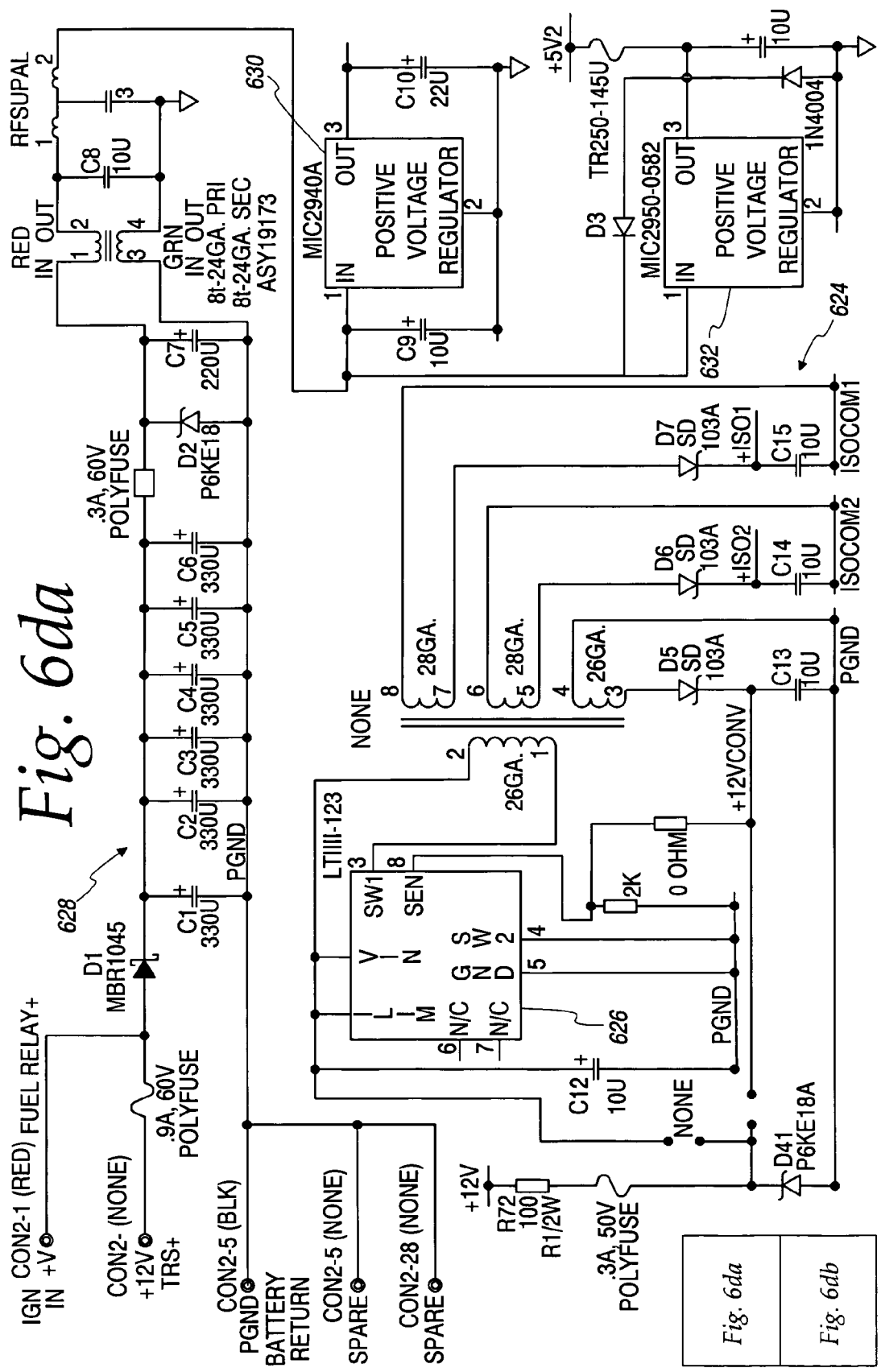

Referring now to FIGS. 6a–d, one example of a fumigation controller is described. The controller is a programmable servo controller designed for controlling valves in the propane fumigation system (FIG. 6a–b). Alternatively, the controller may control servomotors that are used for fly-by-wire engine throttle devices (FIG. 6c–d). Other applications are possible. It will be realized by those skilled in the art that various changes and/or modifications may be made to the controller described herein to adapt it to various applications or to optimize performance. Since both examples share many components, they will be discussed together.

A flash microcontroller 602, which is a RISC type architecture made by Micro Chip, and, in one example, is a PIC18F252 is used for various control functions. The microcontroller 602 is operated with an internal 40 MHz clock speed to give 10 MIPS typical operation speed. The microcontroller 602 contains five, 10-bit analog to digital converters that are multiplexed with a 4 pole, 2-position IC analog switch 604, for instance, a switch having part number MAX4533EPP, which is manufactured by Maxim Semiconductor. The analog multiplexer 604 expands the five analog inputs to twelve analog inputs to allow all of the sensor data to be measured by the microcontroller 602 at A/D input pins RA0, RA1, RA2, RA3, and RA5. The analog sensor data is input either directly to the microcontroller analog-to-digital (A/D) input or through the multiplexer 604, in order of importance. The primary A/D input is found on input RA0, which is the most frequently scanned analog input, which is from the fuel pressure transducer for feedback closed loop control of the propane fuel pressure applied to the engine manifold.

The multiplexer 604 shares eight inputs to the remaining four A/D microcontroller inputs. The two highest priority analog signals are the propane fuel pressure at the output of the regulator and the manifold pressure, which is used to determine the fuel pressure to deliver to the engine. These two inputs, fuel pressure and manifold pressure, are both converted to a digital value at a rate of 2500 times/second and are both averaged over 6 milliseconds for the value used for calculating the fuel delivery. The next set of analog inputs are secondary in priority and are converted at a rate of 1250 times/second, and averaged over 13 milliseconds, are MapOut, FuelPedal1, and FuelTemp, coming from the multiplexer 604. The last group of analog data are of less priority and are converted at a rate of 625 times/second and averaged over 26 milliseconds are FuelPedal2 and WaterTemp.

The fuel pressure, which is relative to fuel quantity delivered to the engine, is being controlled. The fuel and manifold pressures are converted by the microcontroller 602 A/D inputs at a relatively high rate to maintain good close loop servo control of the fuel vs. manifold pressure. The input of the fuel pressure signal is connected to the controller at pin 37 of a connector 608. The connector 608 may be any suitable electrical connector as is known in the art.

The fuel pressure signal is buffered by op-amp 606 and the output of op-amp 606 is connected to the RA0 A/D input of controller 602 at pin 2. The input op-amp 606 is configured in this embodiment as a unity gain amplifier but may be configured with offset and gain when used in the 5602 for the throttle position sensor input. Slower conversion rates of these two sensors would cause delays that would cause instability resulting in overshoot, undershoot, and ringing or hunting of the propane delivery around the calculated fuel delivery target. This method is very effective in controlling the propane fuel delivery with good transient response and good steady state closed loop control of the propane delivered maintaining the target value calculated by the microcontroller. The secondary inputs are not required as often to keep the servo loop at the target value but are needed less often to allow fuel target selections and adjustments of the fuel target value. Fuel temperature and MapOut are not as often converted as these inputs are used to adjust the fuel target value and have a less critical part in the closed loop operation of the fuel delivery.

The FuelPedal1 input is the user commanded input to inform the controller that the fuel pedal position is to allow supplemental propane fuel to be delivered when above the idle position and above a minimum fuel pedal position to select fuel target value. FuelPedal2 is even less often converted as it is used for comparison to the FuelPedal1 position for redundancy to check that the FuelPedal signals are relative to one another for fault shut down in the event of a fuel pedal open, short or faulty operation in the fuel pedal circuit. The water temperature sensor is one of the low priority analog inputs that are used to adjust the fuel target value but since the water temperature has a long delta, this data can be updated at a much slower rate than other analog data. The controller, via the multiplexer 604, measures the MapOut signal used for the monitor display and fault detection of this output voltage from the controller to the vehicle ECU.

Several spare A/D inputs that are not used in the present example of the propane fumigator controller, found on the schematic as Spare Analog Input, pin 41 of the connector 608 and Analog Input (Spare), pin 35 of the connector 608. These inputs are multiplexed with the multiplexer 604 and are available for future input signals. The input labeled Spare analog input at pin 41 of the connector 608 can alternately be used as a digital function with a R11 pull up resistor installed. By reading the voltage on this pin, a switch function can be assigned or a potentiometer can be connected for a variable input function, such as scaling the total propane delivered vs. the voltage input at pin 41 of the connector 608.

The other inputs to the microcontroller 602 are Tach or RPM at pin 20 of the connector 608, Coil-RPM at pin 34 of the connector 608, and Enable Propane Fumigation Input at pin 29 of the connector 608. In this example, these are digital inputs. The RPM signal can come from three sources, a tachometer input signal in the form of a 0–5 volt or 0–12 volt signal at the input pin 20 of the connector 608 that is debounced and converted to a 0–5 volt signal connected to the microcontroller interrupt input, RB0, which the microcontroller interrupts on the edge of this signal to measure the engine speed. The RPM signal can also be supplied by a magnetic pickup signal connected to pins 21 of the connector 608 and 33. The magpickup signal is clamped to negative 0.7 volts by diode D40 and clamped to positive +5 volts by zener diode D3, protecting the voltage comparator input at operational amplifier 610 pin 5. The third RPM signal input can be from an ignition coil primary signal that is connected to pin 34 of the connector 608 to the ignition coil primary C-terminal. The high voltage inductive voltage spike at this input is lowered by the series zener diode D36 and current limited by the 10K ohm resistor R65 to develop a voltage at input of pin 5 of comparator 610. The voltage comparator 610 can be programmed by the microcontroller for a pull up at the input at pin 5 via R63 and D35 connected to pin 26 of microcontroller 602, a microcontroller output pin. The user can select from the program menu what type of input RPM signal is to be used for the microcontroller 602 to select pulling up pin 5 or not of the voltage comparator 610. When the user selects Hall input, the output of microcontroller 602 is high at pin 26 providing a pull-up bias at pin 5 of comparator 610, which is then pulled down by the external Hall effect speed sensor or other digital input signal that can sink the small bias current supplied by the combination of resistor R63 and the diode D35 to the voltage comparator. Diode D39 blocks any input positive input voltages present at the pin 20 of connector 608 input pin. Also, diode D40 clamps any negative voltage at pin 20 of connector 608 as well.

When the user selects MagInput in the program menu for the Tach input signal, the pull up bias is also selected for the comparator input. When the user selects Coil tach input the pull up bias is turned off and not supplied to the comparator input. The Coil input provides bias to the comparator input when the coil terminal voltage rises high enough the reverse bias Zener diode D36, about 100 volts positive. When pin 5 input of the comparator 610 rises above the reference voltage at the inverting input at pin 6 of comparator 610, then the comparator output at pin 7 goes high to +5 volts, and pin 7 is connected to the microcontroller 602 at pin 21 to provide the tach-input signal. In this example, the resistor R59 is a 200K-ohm resistor provides positive feedback or hysteresis for comparator 610 to keep the output stable at low input slow rise and falling signals. This RPM input circuit uses circuitry to allow a wide range and type of input signals using a single voltage comparator that can be user/menu selected for the specific type of input signal connected to the controller.

The input labeled "Enable Propane Fumigator" is used to enable the propane fumigation system to supply propane to the engine when the fuel target has been set, if this input is at +12 volts input. This input is buffered by transistor Q11, to set the input at pin 24 of controller 602 low when enabled to operate. The output fuel valve will remain closed if this input is not enabled to prevent fuel from exiting the propane tank, via fuel valve output at pin 10 of connector 608.

The microcontroller 602 is connected to EEPROM 612, or electrically erasable programmable read only memory device, a 24LC256 device from Micro Chip that allows 256-killobits of serial data to be stored. It is connected to the microcontroller over two control lines, a clock and serial data input/output line. Pin 6 of memory device 612 is the CLK or clock input of the EEPROM and is connected to the microcontroller pin 15 that supplies the clock output pin 5 of EEPROM 612 is the SDA or data I/O pin connected to the microcontroller I/O pin 14. The user menu and operating parameters are stored in the EEPROM 612 and are loaded into the microcontroller RAM registers at power on. The user interface is described in US patent U.S. Pat. No. 6,304,814, which has been incorporated herein by reference in its entirety, and is used in the programming of this controller via a handheld programmer or PC. The EEPROM 612 also provides data storage for a data acquisition mode of the controller. The amount of memory used by the EEPROM 612 for data acquisition is, in one example, 16 Kbytes and the EEPROM 612 may store from 20 seconds at 10 ms per sample to 16000 minutes at 8 minutes per sample of data. The data stored is all of the input sensor and output control parameters; see the menu chart for the list of monitor items that are stored. In addition faults are stored in a fault log, which, in one example, holds the last 10 faults in operation as they have occurred. The faults are rotated down the fault list, as new faults are stored in the fault log.

The microcontroller 602 communicates over a standard RS232C serial cable connected to the DB-9 pin connector to the handheld programmer or any PC running Windows operating system. The RS232 IC 609 is connected to the UART com-Port of the microcontroller 602 at pins 18 and 17. The serial communications operates at 9600 baud for the programming and monitor transfers, but switches to 115 Kbaud when transferring the data acquisition from EEPROM 612 to the PC.

The outputs of the microcontroller 602 control the fuel shutoff valve at pin 10 of the connector 608, the Map relay at pin 9 of connector 608 (if used), PWM water valve at pin 11 of connector 608, Spare driver at pin 12 of connector 608, the Fuel PWM valve at pins 7 and 4 of the connector 509. Also outputs for remote monitoring are available at pins 40,39, and 3 for remote LED drive or isolated interface of controller status, Map output at pin 42 of connector 608, that can provide and adjusted/limited Map output signal to the vehicle ECU.

The microcontroller 602 has two PWM outputs, one at pin 13 and the other at pin 12. The PWM output at pin 13 is used to provide a pulse stream to the filter network of R41, C38, R42, C39, that filters to provide a voltage at the input of the buffer amplifier pin 5 of operational amplifier 620, which is a unity gain operational amplifier. The frequency of the PWM at this pin is of at least 15 kHz for quick response while allowing small RC time constants in the filter network and results in very low output voltage ripple. The output voltage at pin 7 of the operational amplifier 620 is connected to a jumper or diode at D30 which will provide a simulated MAP output voltage at pin 42 of connector 608 via current limiting resistor R44. The Map signal at pin 7 of the operational amplifier 620 can be connected using the diode D30 installed and R43 installed in a slightly different configuration to provide a function of MAP output signal clamping. In the MAP signal-clamping mode the MAP input signal is buffered by operational amplifier 620 at pin 1 and connected to the node of R43 and diode D30, which is then connected to the output resistor R44. The clamping mode allows operation of the vehicle MAP sensor input, which is intercepted by an external MAP relay and then output to the vehicle ECU via connection to pin 42 of connector 608. The output of operational amplifier 620 at pin 7 provides the clamping action in this mode to allow the MAP output signal to match the input MAP signal to a desired level and then be clamped to a maximum output value via diode D30 to pin 7 of operational amplifier 620. The ECU will not be allowed to see an over boost MAP signal as limited by the programmed value in the controller. The present embodiment uses the user assigned MAP output function that is programmed in the menu of the controller to output a MAP signal level to the ECU that is internally limited by the PWM value being limited, set by the parameters in the program menu. This mode eliminates the external Map relay but does require that the controller remain powered on all the time the vehicle is operating to provide the controller derived MAP output signal to the vehicle ECU.

The PWM output signal used for driving the fuel control valve is at pin 12 of microcontroller 602. This PWM is a low frequency of about 40 Hz chosen for the best response of the electromechanical time constants of the valve used to control the flow of propane via the regulator. This PWM signal drives a Smart-FET, Q2, a device such as a VNP14N04, from ST-MicroElectronics. The control valve is connected to +12 volts via pin 4 of connector 608 and connected to the Q2 drain terminal at pin 7 of connector 608, which sinks the solenoid valve current to ground, to actuate the control valve. The duty cycle of the control valve allows the fuel flow to be regulated to the desired target fuel value. The Smart-FET Q2 provides protection if the control valve terminal is shorted to positive battery voltage or the valve were to short circuit, Q2 would turn off from over temperature or over current to protect the wiring and other circuit elements.

The output PWM Water controls an optional water solenoid valve that is used to regulate the temperature of the propane mixer evaporator assembly to prevent excessively cold or hot temperature operation of the regulator. This output is a low frequency PWM of about 10–40 Hz at pin 11 of the connector 608, provided by a Smart-FET transistor that sinks current to ground when biased ON.

In an alternate embodiment the PWM output at pins 7 and 4 of the connector 608 is a push-pull output when all 4 of the Smart-FET transistors are installed on the control board. In addition, a second processor is required to provide gate drive with a programmed dead time period between the top and bottom transistors in the output bridge circuit. Microcontroller 640, a PIC18F1320, from Micro Chip is used to provide converting the PWM signal from the microcontroller 602 into two outputs with dead time control to the 3

Drivers 634, 636 and 638 of the 4 Smart-FETs. When all 4 of the transistors are installed the power supply for the topside transistors must be supplied as well, as these are isolated +15 volt supplies. A switch mode power supply section 624 is now described. Element 626 is an 8-pin current mode-switching controller IC that contains an output drive transistor to drive up to 1.25 amps, to drive the primary winding of transformer T2. T2 has 3 output winding sections that are isolated from one another. Two of the output windings provide the +15 volts gate drive to the optically isolated MOSFET gate drivers 636 and 638. The third winding of T2 provides +12 volts for feedback to the U3 switch mode controller IC 626 and also provides +12 volts, which is ground referenced to the bottom side bridge MOSFET driver IC 634. The Topside MOSFET drivers are of a type such as the optically isolated HCPL-3150, from Agilent Semiconductor. The bottom side driver is a dual driver of the type such as MC33152, from On-Semiconductor.

The topside drivers are not allowed to turn on after power is applied to the controller until the microcontroller has been reset and initialized to prevent any improper transistor turn-on during power on sequence or a microcontroller reset event. This control is provided by transistor Q5, a PNP signal transistor such as a 2N2907 type that is connected to the +5 volt on the emitter pin and which the base pin is biased form the microcontroller 602 at pin 11 via resistor R28. Unless pin 11 of the microcontroller 602 goes low, indicating power on sequence has been accomplished, the topside MOSFET drivers will not have bias voltage applied to the anode of each LED within drivers 636 and 638 to permit output drive. After bias has been supplied via Q5 collector to R35 and R29 to the anode of LED's in drivers 636 and 638, the PWM drive signal present at the same anode terminals will then allow the drivers to drive the top side Smart-FETs, Q1 and Q3, the same type as the Q2 transistor, a VNP14N04. By using T0-220 Smart-FETs in the bridge output circuit the output drive can be scaled for the servo actuator size or load requirement. The VNP14N04 allows up to 14 amperes output current, which is derated to about 6 amps with the potting compound providing heat sinking in the present enclosure used. Larger or smaller Smart-FETs are available for smaller loads or larger loads over 50 amps.

The use of the isolated power supplies to power the top side MOSFETS allows for the top transistors to be driven at 100% on if so desired, but the PWM is limited to between 98% and 2% duty cycle so that if the Smart-FETs were to shut off the fact that the input signal switches every cycle will try to reset the transistors if they have shut off. Since all four of the bridge transistors are Smart-FETs the output is protected from shorts to the battery positive or ground.

A power supply portion 628 of the controller consists of input reverse polarity protection, filtering and over voltage clamping. The battery input is supplied to the circuit via the input Schottky diode D1 and filtered by the multiple capacitor bank C1–C6, each a 330 microfarad 35 volt electrolytic capacitor. The input voltage is clamped by a transient surge absorber D2, a device such as a P6KE18, which clamps the input under 25 volts and allows the polyfuse in series with the input diode D1 to open circuit in the event of a large over voltage that causes more than 0.3 amps to flow through the polyfuse R1 and the surge absorber. The filtered voltage is then connected to two 5 volt LDO type voltage regulators, 630 and 632. The output of regulator 630 supplies +5 volt for the controller circuitry. The regulator 632 supplies +5 volt for the external sensors and is protected by a poly fuse F3, ling the output current to under 0.145 amp, typically.

In the present approach, the switch mode controller 626 is not used and is jumpered around to supply +12 volts to the driver IC 634. The jumper J2B is installed to provide +12 volts to the driver 634 via input limiting resistor R72, a 100-ohm ½ watt resistor and clamped by the transient surge absorber/Zener diode D41 to clamp the driver voltage to about 12–13 volts.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of adjusting the rate of supplementary fuel flow to an engine, the method comprising:
    applying a first pressure to a regulator valve causing a fuel flow to occur at an outlet of the regulator valve;
    adjusting the first pressure based at least in part upon a monitored second pressure at the outlet of the regulator valve and a stored target pressure, the stored target pressure based upon operating characteristics of an engine, the adjusting altering the fuel flow at the outlet of the regulator valve; and
    wherein the fuel flow at the outlet of the regulator valve is substantially not affected by a third pressure downstream of a restriction, the restriction being positioned downstream of the regulator valve.

2. The method of claim 1 further comprising determining an operational window defining the ideal operating characteristics of the engine, continuously monitoring and comparing operating characteristics to the operational window, and increasing the fuel rate to the engine when sensed operating characteristics remain within the operational window.

3. The method of claim 2 further comprising detecting when the sensed operating characteristics are approaching a limit of the operational window.

4. The method of claim 3 further comprising decreasing the fuel rate as the sensed operating characteristics approach the limit of the operating window.

5. The method of claim 2 wherein the sensed operating characteristics are chosen from the group of system activation, engine revolutions per minute (RPM), manifold absolute pressure (MAP), and accelerator pedal position.

6. A system for supplying supplementary fuel to and engine comprising:
    a memory for storing an operational window, the operational window defining the optimum operating characteristics of the engine; and
    a controller coupled to the memory, the controller receiving operating characteristics of the engine, comparing the sensed operational characteristics to the operational window, and selectively adjusting a pressure applied to a regulator valve based upon the comparing.

7. The system of claim 6 wherein the controller further comprises means for increasing the pressure setting to the regulator valve when the sensed operating characteristics remain within the operational window.

8. The system of claim 7 the controller further comprises means for detecting when the sensed operating characteristics are approaching a limit of the operational window.

9. The system of claim 8 the controller further comprises means for decreasing the pressure setting to the regulator valve as the sensed operating characteristics approach the limit of the operating window.

10. The system of claim 6 wherein the operating characteristics are chosen from the group of system activation, engine revolutions per minute (RPM), manifold absolute pressure (MAP), and accelerator pedal position.

11. A method of developing a target fuel pressure for an engine comprising:
- receiving a plurality of calibration values;
- receiving a plurality of operating conditions;
- scaling the operating parameters based on the calibration values; and
- determining a target pressure based at least in part upon a stored relationship between the target pressure and the plurality of scaled operating conditions.

12. The method of claim 11 further comprising determining an operational window.

13. The method of claim 12 further comprising increasing the target pressure when the sensed operating conditions remain with the window.

14. The method of claim 12 further comprising detecting when the sensed operating conditions are approaching a limit of the window.

15. The method of claim 12 further comprising decreasing the target pressure as the sensed operating conditions approach the limit of the window.

16. A method of adjusting the rate of supplementary fuel flow to an engine, the method comprising:
- monitoring operating characteristics of an engine;
- storing a relationship between a target pressure and operating conditions in electronic memory;
- receiving calibration values from a user;
- applying the calibration values to at least some of the received operating characteristics;
- applying at least some of the calibrated operating characteristics to the relationship to generate the target pressure at the outlet of a regulator valve; and
- adjusting a control pressure applied to the regulator valve based at least in part upon the target pressure, wherein the target pressure is substantially unaffected by a pressure at a restriction, the restriction being downstream of the regulator valve.

* * * * *